US012591839B2

(12) United States Patent
Gustafsson et al.

(10) Patent No.: US 12,591,839 B2
(45) Date of Patent: Mar. 31, 2026

(54) ROBOTIC HANDLING SYSTEM FOR HIGH PRIORITY ITEMS

(71) Applicant: ZEBRA TECHNOLOGIES CORPORATION, Lincolnshire, IL (US)

(72) Inventors: Anders Gustafsson, Lincolnshire, IL (US); Edward Barkan, Miller Place, NY (US); Darran Michael Handshaw, Sound Beach, NY (US); Joseph Cabana, Centereach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/078,707

(22) Filed: Dec. 9, 2022

(65) Prior Publication Data

US 2024/0193533 A1     Jun. 13, 2024

(51) Int. Cl.
*G06Q 10/0833* (2023.01)
*G05D 1/00* (2006.01)

(52) U.S. Cl.
CPC ....... *G06Q 10/0833* (2013.01); *G05D 1/0214* (2013.01); *G05D 1/0225* (2013.01)

(58) Field of Classification Search
CPC ............. G06Q 10/0833; G06Q 10/083; G06Q 10/087; G06Q 10/0841; G06Q 10/0843; G06Q 10/08365; G06Q 30/0633; G06Q 30/0635; G06Q 50/40; G06Q 50/60; G05D 1/0214; G05D 1/0225
See application file for complete search history.

(56) References Cited

U.S. PATENT DOCUMENTS

| | | | | |
|---|---|---|---|---|
| 10,919,163 | B1 * | 2/2021 | Li | B60L 53/12 |
| 2003/0006879 | A1 * | 1/2003 | Kang | G08B 13/189 |
| | | | | 340/5.61 |
| 2003/0179073 | A1 * | 9/2003 | Ghazarian | E05B 47/00 |
| | | | | 340/5.6 |
| 2017/0242437 | A1 * | 8/2017 | Chan | G08B 13/2491 |
| 2017/0253259 | A1 * | 9/2017 | Seaton | B61L 23/00 |
| 2019/0188940 | A1 * | 6/2019 | Kanoria | B60R 25/24 |
| 2019/0300259 | A1 * | 10/2019 | Ruth | B65D 55/14 |
| 2020/0207230 | A1 * | 7/2020 | Evans | B60L 53/34 |
| 2020/0223632 | A1 * | 7/2020 | Melanson | G05D 1/0088 |
| 2020/0364653 | A1 * | 11/2020 | Rongley | G05D 1/0088 |

OTHER PUBLICATIONS

Meaker, Morgan, "The tiny self-driving robots trying to win over locals in Milton Keynes," The Telegraph, telegraph.co.uk, Oct. 25, 2020.*
International Search Report and Written Opinion for International Application No. PCT/US2023/082202 mailed on Jan. 11, 2024.

* cited by examiner

*Primary Examiner* — Nathan Erb

(57) ABSTRACT

Techniques for controlling a mobile robot to escort high priority items are disclosed herein. An example mobile robot includes an electronically securable storage compartment electronically controllable between a stored state and an accessible state. The example mobile robot further includes a user access controller configured to receive a user authorization indicating a desired user access to the electronically securable storage compartment. The user access controller may also trigger a mitigation protocol when the electronically securable storage compartment is accessed without receiving the user authorization.

13 Claims, 7 Drawing Sheets

*200*

*115* — Electronically Securable Storage Compartment

*116* — Navigation Controller

*117* — User Access Controller

*204* — Memory

Networking Interface — *210*

Processor — *202*

I/O Interface — *212*

*400*

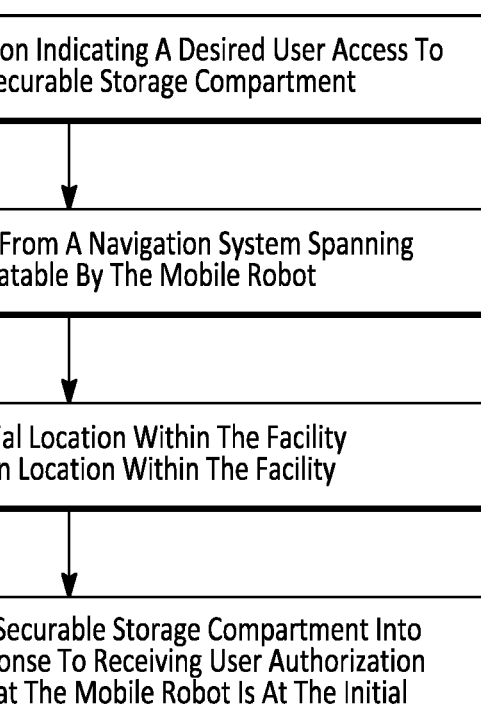

402 — Receive A User Authorization Indicating A Desired User Access To An Electronically Securable Storage Compartment 404 — Receive Positional Data From A Navigation System Spanning A Facility Navigatable By The Mobile Robot 406 — Determine An Initial Location Within The Facility And A Destination Location Within The Facility 408 — Enter The Electronically Securable Storage Compartment Into The Stored State In Response To Receiving User Authorization And A Confirmation That The Mobile Robot Is At The Initial Location 410 — Enter The Electronically Securable Storage Compartment Into The Accessible State In Response To Receiving The User Authorization And A Confirmation That The Mobile Robot Is At The Destination Location

FIG. 4

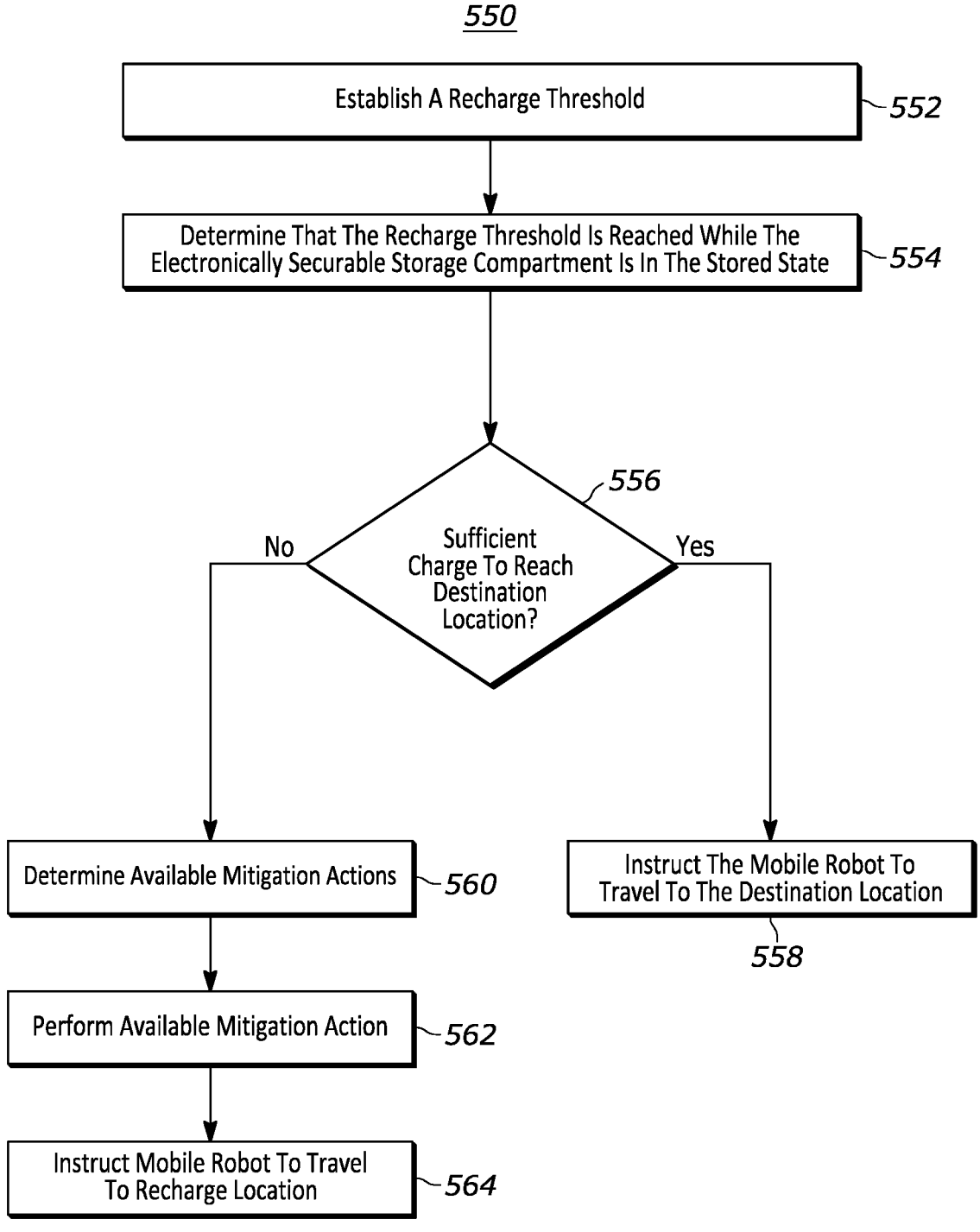

_550_

Establish A Recharge Threshold ~_552_

Determine That The Recharge Threshold Is Reached While The Electronically Securable Storage Compartment Is In The Stored State ~_554_

_556_

Sufficient Charge To Reach Destination Location?

No

Yes

Determine Available Mitigation Actions ~_560_

Instruct The Mobile Robot To Travel To The Destination Location

_558_

Perform Available Mitigation Action ~_562_

Instruct Mobile Robot To Travel To Recharge Location ~_564_

FIG. 5B

ROBOTIC HANDLING SYSTEM FOR HIGH PRIORITY ITEMS

BACKGROUND

With high security or high risk of theft items, many businesses implement security/risk mitigation solutions to prevent theft or enhance security of others. For instance, hardware stores have begun implementing mitigation solutions to prevent security risks and/or theft incidents. Such mitigation solutions may include locking a shopping cart's wheels if the cart does not pass through the point of sale (POS), disabling some/all functionality of power tools until the power tools pass through a POS station, creating secure shelves and tool crib areas where expensive or high-risk items can only be input or removed through a single, monitored access point.

Problematically, these mitigation solutions still present customers, employees, and store owners with scenarios in which high-risk items may be acquired without appropriate oversight. Thus, in many conventional scenarios, store employees escort a customer interested in purchasing a high-risk item to the POS station to make sure the customer pays for the high-risk item.

Healthcare settings, for example, present their own set of challenges associated with secure handling of high priority items, such as medications that contain narcotics or other controlled substances, which require controlling and tracking the chain of custody. Furthermore, tracking patient locations and authenticating patients to ensure that they receive appropriate medications and care is extremely important and conventionally involves some form of human intervention. Patients are typically given medications on a daily basis, may be moved from one room to another, and may require a variety of other types of assistance that competes for allocation of limited medical personnel resources.

Thus, there is a need for a robotic handling system that allows for efficient and accurate handling of high priority items without requiring human intervention.

SUMMARY

In an embodiment, the present invention is a mobile robot. The mobile robot includes: an electronically securable storage compartment accessible to a user and electronically controllable between a stored state in which contents within the electronically securable storage compartment are inaccessible to the user and an accessible state in which the contents within the electronically securable storage compartment are accessible to the user; and a user access controller configured to receive from a user a user authorization indicating a desired user access to the electronically securable storage compartment, the user access controller further configured to trigger a mitigation protocol when the electronically securable storage compartment is accessed without receiving the user authorization.

In a variation of this embodiment, the user access controller is configured to enter the electronically securable storage compartment into the stored state in response to receiving user authorization and a confirmation that the mobile robot is at an initial location and configured to enter the electronically securable storage compartment into the accessible state in response to receiving the user authorization and a confirmation that the mobile robot is at a destination location.

In another variation of this embodiment, the user access controller is further configured to (i) issue an alert when the electronically securable storage compartment remains in the accessible state for a predetermined time period, and (ii) enter the electronically securable storage compartment into the stored state after the predetermined time period.

In yet another variation of this embodiment, the mobile robot further includes: a sensor configured for tracking inventory of the contents of the electronically securable storage compartment. Further in this variation, the user access controller is further configured to issue an alert when the inventory of the contents of the electronically securable storage compartment violates a predetermined condition.

In still another variation of this embodiment, the user access controller is further configured to: initiate a secured operation state of the mobile robot; and maintain the mobile robot in the secured operation state from an initial location to a destination location, wherein the secured operation state includes one or more of: (i) securing the electronically securable storage compartment, (ii) being assigned to move with a subject throughout the facility, (iii) detecting sensor data associated with the subject, (iv) being assigned to monitor vitals of the subject during movement of the subject, (v) being assigned to greet the subject and direct the subject to a further destination, or (vi) monitoring the electronically securable storage compartment during travel from the initial location to the destination location.

In yet another variation of this embodiment, the mobile robot further includes a navigation controller configured to: establish a recharge threshold, such that, in a default battery usage protocol, the navigation controller instructs the mobile robot to travel to a charger location to recharge a battery of the mobile robot when a battery level is at or below the recharge threshold; determine that the recharge threshold is reached while the electronically securable storage compartment is in the stored state; and enter an alternate battery usage protocol by instructing the mobile robot to travel to the destination location when (i) the battery level is at or below the recharge threshold and (ii) sufficient charge is present in the battery to reach the destination location.

In still another variation of this embodiment, the user authorization is selected from a group consisting of: (i) payment confirmation, (ii) facial recognition of the user, (iii) identification (ID) verification, (iv) biometric verification, (v) scanning an indicia, (vi) confirmation that the mobile robot is at a destination location, or (vii) password verification.

In yet another variation of this embodiment, the mitigation protocol is selected from a group consisting of: (i) alerting security personnel, (ii) activating an onboard annunciator, (iii) activating a remote annunciator, (iv) capturing image data of an unauthorized user, (v) capturing video data of the unauthorized user, (vi) broadcasting a signal to deactivate the contents within the electronically securable storage compartment, (vii) following the unauthorized user to an exit door, (viii) following the unauthorized user to a car to obtain pictures of a license plate of the car, (ix) charging the unauthorized user for a value of the contents within the electronically securable storage compartment, or (x) transmitting a signal to secure the exit door.

In another embodiment, the present invention is a method for controlling a mobile robot to escort high priority items. The method includes: receiving, from a user, a user authorization indicating a desired user access to an electronically securable storage compartment, the electronically securable storage compartment being accessible to a user and electronically controllable between a stored state in which contents within the electronically securable storage compartment are inaccessible to the user and an accessible state in which the contents within the electronically securable storage compartment are accessible to the user; and issuing an alert when the electronically securable storage compartment remains in the accessible state for a predetermined time period.

In a variation of this embodiment, the method further includes: entering the electronically securable storage compartment into the stored state in response to receiving user authorization and a confirmation that the mobile robot is at an initial location; and entering the electronically securable storage compartment into the accessible state in response to receiving the user authorization and a confirmation that the mobile robot is at a destination location.

In another variation of this embodiment, the method further includes: entering the electronically securable storage compartment into the stored state after the predetermined time period.

In yet another variation of this embodiment, the method further includes: receiving sensor data from a sensor configured to track inventory of the contents of the electronically securable storage compartment; determining when the inventory of the contents of the electronically securable storage compartment violates a predetermined condition; and issuing an alert when the inventory of the contents of the electronically securable storage compartment violates the predetermined condition.

In still another variation of this embodiment, the method further includes: initiating a secured operation state of the mobile robot; and maintaining the mobile robot in the secured operation state from an initial location to a destination location, wherein the secured operation state includes one or more of: (i) securing the electronically securable storage compartment, (ii) being assigned to move with a subject throughout the facility, (iii) detecting sensor data associated with the subject, (iv) being assigned to monitor vitals of the subject during movement of the subject, or (v) being assigned to greet the subject and direct the subject to a further destination.

In yet another variation of this embodiment, the method further includes: establishing a recharge threshold, such that, in a default battery usage protocol, the navigation controller instructs the mobile robot to travel to a charger location to recharge a battery of the mobile robot when a battery level is at or below the recharge threshold; determining that the recharge threshold is reached while the electronically securable storage compartment is in the stored state; and entering an alternate battery usage protocol by instructing the mobile robot to travel to the destination location when (i) the battery level is at or below the recharge threshold and (ii) sufficient charge is present in the battery to reach the destination location.

In yet another embodiment, the present invention is a method for controlling a mobile robot to deliver high priority items. The method includes: receiving, from a user, a user authorization indicating a desired user access to an electronically securable storage compartment of the mobile robot, the electronically securable storage compartment being accessible to a user and electronically controllable between a stored state in which contents within the electronically securable storage compartment are inaccessible to the user and an accessible state in which the contents within the electronically securable storage compartment are accessible to the user; receiving positional data from a navigation system spanning a facility navigatable by the mobile robot; determining, in response to the received positional data, an initial location within the facility and a destination location within the facility; establishing a recharge threshold, such that, in a default battery usage profile, the navigation controller instructs the mobile robot to travel to a charger location to recharge a battery of the mobile robot when a battery level is below the recharge threshold; determining that the recharge threshold is reached while the electronically securable storage compartment is in the stored state; and entering an alternate battery usage profile by instructing the mobile robot to travel to the destination location when (i) the battery level is at or below the recharge threshold and (ii) sufficient charge is present in the battery to reach the destination location.

In a variation of this embodiment, the method further includes: issuing an alert when the electronically securable storage compartment remains in the accessible state for a predetermined time period. Further in this variation, the method further includes: entering the electronically securable storage compartment into the stored state after the predetermined time period.

In another variation of this embodiment, the method further includes: receiving sensor data from a sensor configured to track inventory of the contents of the electronically securable storage compartment; and issuing an alert when the inventory of the contents of the electronically securable storage compartment violates a predetermined condition.

In still another variation of this embodiment, the method further includes: initiating a secured operation state of the mobile robot; and maintaining the mobile robot in the secured operation state from the initial location to the destination location, wherein the secured operation state includes one or more of: (i) securing the electronically securable storage compartment, (ii) being assigned to move with a subject throughout the facility, (iii) detecting sensor data associated with the subject, (iv) being assigned to monitor vitals of the subject during movement of the subject, or (v) being assigned to greet the subject and direct the subject to a further destination.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 4 is a flowchart representative of a method for controlling a mobile robot to escort high priority items, in accordance with embodiments described herein.

FIG. 5B is a flowchart representative of yet another method for controlling a mobile robot to escort high priority items, in accordance with embodiments described herein.

Figure 1:
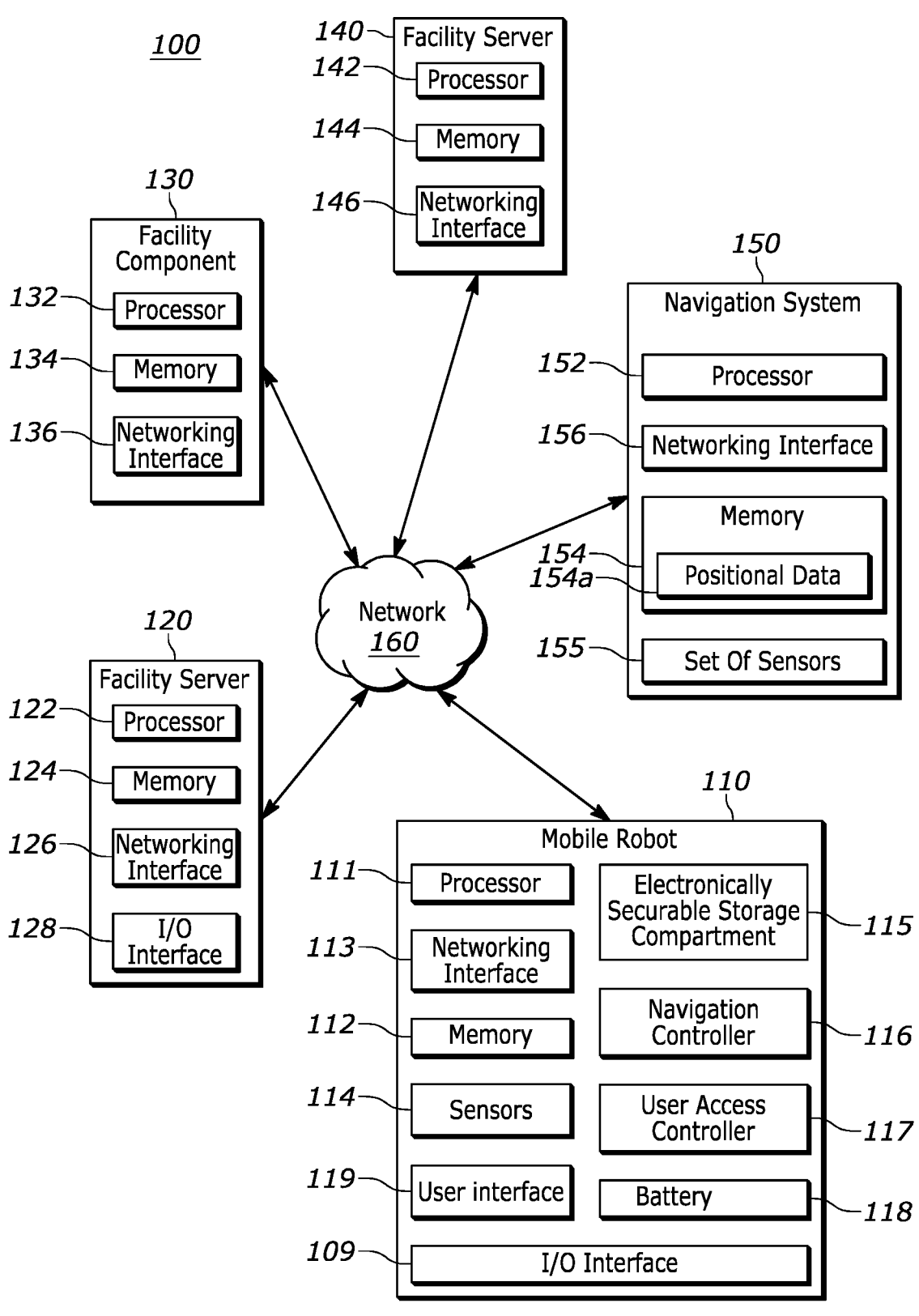
FIG. 1 is an example system for controlling a mobile robot to escort high priority items, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As previously mentioned, many conventional scenarios require human intervention to provide assistance and/or otherwise enable a customer/patient (also referenced herein as "individuals") to obtain/acquire required goods/services. However, requiring that employees escort and/or otherwise dedicate time to providing many of these currently required goods/services is incredibly time-intensive, inefficient, and generally results in a non-optimized work environment that reduces the ability of such employees to provide goods/services to other individuals that may make better use of the employee's skills. Thus, it is an objective of the present disclosure to eliminate these and other problems with conventional escort systems/techniques by enabling a mobile robot to automatically and intelligently escort/track high priority items, including without limitation, items which are at a high risk for theft (e.g., tools, controlled substance medications), as well as other high priority items (e.g., confidential materials, tobacco, alcohol, flammables, fertilizers, spray paints, parts in a manufacturing or design environment, laboratory samples, high price items) requiring secured transport between destinations in a facility.

In particular, the techniques of the present disclosure provide solutions to these problems associated with conventional escort techniques. Namely, the techniques of the present disclosure alleviate these efficiency issues associated with conventional escort techniques by introducing a mobile robot with an electronically securable storage compartment, a user access controller, and a navigation controller. These components enable the mobile robots and corresponding computing systems described herein to electronically control the electronically securable storage compartment between a stored state and an accessible state, in which the contents within the electronically securable storage compartment are either accessible or inaccessible to a user. The navigation controller may determine an initial location within a facility and a destination location within the facility for the mobile robot, and the user access controller may then enter the electronically securable storage compartment into the stored state or the accessible state based on receiving a user authorization and a confirmation that the mobile robot is at the initial location or the destination location. In this manner, the techniques of the present disclosure enable a mobile robot to securely and efficiently escort high priority items through a facility without requiring additional oversight, such as from an employee of the facility.

The present disclosure includes improvements in computer functionality relating to secured robotic transport of items by describing techniques for enhancing security and efficiency of high priority item transport. That is, the present disclosure describes improvements in the functioning of a mobile robot itself and results in improvements to technologies in the field of secure robotic item transport because the disclosed mobile robot includes improvements to secured item handling algorithms and associated robotic navigation control. The present disclosure improves the state of the art at least because previous item escorting/security systems lacked enhancements described in this present disclosure, including without limitation, enhancements relating to: (a) location, item, and/or user authentication, (b) item access duration, (c) robotic charging functionality, as well as other enhancements relating to mobile robot transport of high priority items described throughout the present disclosure.

In addition, the present disclosure includes applying various features and functionality, as described herein, with, or by use of, a particular machine, e.g., a mobile robot, an electronically securable storage compartment, a user access controller, a navigation controller, and/or other components as described herein.

Moreover, the present disclosure includes specific features other than what is well-understood, routine, conventional activity in the field, or adding unconventional steps that demonstrate, in various embodiments, particular useful applications, e.g., a user access controller configured to receive from a user a user authorization indicating a desired user access to the electronically securable storage compartment, wherein the user authorization is via a protected communication protocol; and a navigation controller configured to receive positional data from a navigation system spanning a facility navigatable by the mobile robot, the navigation controller further configured to determine, in response to the received positional data, an initial location within the facility and a destination location within the facility, wherein the user access controller is configured to enter the electronically securable storage compartment into the stored state in response to receiving user authorization and a confirmation that the mobile robot is at the initial location and configured to enter the electronically securable storage compartment into the accessible state in response to receiving the user authorization and a confirmation that the mobile robot is at the destination location.

FIG. 1 is an example system 100 for controlling a mobile robot to escort high priority items, in accordance with embodiments described herein. Generally speaking, the system 100 may cause the mobile robot 110 to secure contents within an electronically securable storage component 115, track/follow an individual via the navigation controller 116, receive authorization and confirmation at the user access controller 117 to provide or deny access to the electronically securable storage component 115, and/or perform any other actions or combinations thereof, as described herein. More specifically, in the example system 100, a mobile robot 110 may arrive at an initial location within a facility (e.g., a hospital, a grocery store, a hardware store, a warehouse, etc.), and the electronically securable storage component 115, navigation controller 116, and user access controller 117 may enable the mobile robot 110 to proceed to a destination location within the facility while escorting a high priority item (e.g., medication, high risk/security products, items to be isolated from contamination such as clothing, among others). It should be appreciated that, while the mobile robot 110 is illustrated in FIG. 1 as a single mobile robot, the example system 100 may include multiple (e.g., a fleet) of mobile robots 110 connected to the network 160 at any given time.

In particular, the mobile robot 110 may include one or more processors 111, one or more memories 112, a networking interface 113, one or more sensors 114, an electronically securable storage compartment 115, a navigation controller 116, a user access controller 117, a battery 118, a user interface 119, and an input/output (I/O) interface 109. Generally speaking, the mobile robot 110 may be or include an autonomous and/or semi-autonomous robot that is configured to plan and execute travel paths within facilities while performing a secure escort function that may include one or more of various actions. For example, the escort function may be or include transporting high priority goods, materials, and/or any other suitable cargo (e.g., medication, high risk/security items (power tools, flammable liquids, etc.)) within the electronically securable storage compartment 115, moving with a subject (e.g., hospital patient, high risk item prospective purchaser) throughout a facility, detecting sensor data (e.g., facial recognition, fingerprinting) associated with the subject, monitoring vitals (e.g., heart rate) of the subject during movement of the subject, greeting and directing the subject to a further destination within the facility, and/or other functions or combinations thereof, as described herein.

In particular, the secure escort function performed by the mobile robot 110 may involve the mobile robot 110 securing and/or otherwise transporting a high priority item within the electronically securable storage compartment 115. As part of the transportation within the electronically securable storage compartment 115, the user access controller 117 may electronically control the compartment 115 to switch between a stored state and an accessible state. In the stored state, the contents within the electronically securable storage compartment 115 may be inaccessible to an individual. In the accessible state, the contents within the electronically securable storage compartment 115 may be accessible to the individual.

For example, when beginning a secure escort function (e.g., while the mobile robot 110 is at the initial location), the user access controller 117 may cause the electronically securable storage compartment 115 to switch into the stored state. As a result, a lid, cover, compartment door, and/or other suitable security mechanism may actuate into a closed position such that the contents within the compartment 115 are inaccessible to individuals. While the mobile robot 110 is traveling from the initial location to the destination location to complete the secure escort function, the lid, cover, compartment door, and/or other suitable security mechanism may remain in the closed position to ensure that no individuals are able to access the contents within the electronically securable storage compartment 115. When the mobile robot 110 reaches the destination location, the user access controller 117 may cause the electronically securable storage compartment 115 to switch into the accessible state. As a result, the lid, cover, compartment door, and/or other suitable security mechanism may actuate into an open position such that the contents within the compartment 115 are accessible to individuals.

Prior to switching the electronically securable storage compartment 115 into the closed state and/or the accessible state, the mobile robot 110 may wait to receive a user authorization indicating a desired user access to the electronically securable storage compartment 115 and a confirmation that the mobile robot 110 is at the initial/destination location. A user may utilize a user computing device 120 to provide the user authorization. The user computing device 120 may include one or more processors 122, one or more memories 124, a networking interface 126, and an I/O interface 128. Generally, the user computing device 120 may be or include a laptop computer, a desktop computer, a smart phone, and/or any suitable computing device that a user may use to connect to the network 160 and transmit/receive instructions, requests, and/or other suitable communications to/from the mobile robot 110. Additionally, or alternatively, in certain embodiments, the user may interact directly with the mobile robot 110 through a user interface 119 to input/receive communications to/from the mobile robot 110, such as inputting the user authorization.

Generally, the user authorization may be or include (i) payment confirmation, (ii) facial recognition of the user, (iii) identification (ID) verification, (iv) biometric verification, (v) scanning an indicia, (vi) confirmation that the mobile robot is at a destination location, and/or (vii) password verification. For example, the mobile robot 110 may reach a destination location within a hospital where medication is to be delivered to a patient. The mobile robot 110 may enter the patient's room, and the mobile robot 100 may perform facial recognition on the patient and/or an attending nurse to authorize the delivery/release of the medication from the electronically securable storage compartment.

In any event, the desired user access to the electronically securable storage compartment 115 may be or represent that an individual requires a high priority item that may be transported by and/or intends to transport a high priority item in the electronically securable storage compartment 115 of the mobile robot 110. For example, the user may be an individual that requires access to the medication, such as a nurse, or that intends to purchase a high risk/security item (e.g., flammable liquids, power tools). The individual may submit and/or otherwise provide user authorization indicating the individual's desired access to the electronically securable storage compartment 115 of the mobile robot 110, such that the mobile robot 110 may proceed to transport the medication or high risk/security item to the individual for access, purchase, etc. Additionally, or alternatively, the user may be an employee of the facility (e.g., nurse, sales staff, etc.) where the mobile robot 110 is located. In these instances, the employee may provide user authorization indicating the employee's desired access to the electronically securable storage compartment 115 of the mobile robot 110, such that the mobile robot 110 may proceed to transport an item to an individual, move with an individual, monitor vitals of an individual, greet individuals, provide directions to individuals, or similar actions.

The confirmation that the mobile robot 110 is at the initial/destination location may be provided directly by a user and/or the mobile robot 110 may autonomously confirm reaching the initial/destination location based on positional data received from the navigation system 150. For example, the mobile robot 110 may be located in a hospital, and may receive a user authorization indicating a desired user access for the mobile robot 110 to deliver medication to a patient. The mobile robot 110 may receive positional data from the navigation system 150 indicating that the mobile robot 110 is currently located in a medication dispensing location within the hospital, such that the mobile robot 110 may determine that the mobile robot 110 is located at the initial location for the secure escort function represented by the user authorization. Accordingly, the mobile robot 110 may transport the medication to a room where the patient is located, and the mobile robot 110 may confirm with the navigation server 150 that the mobile robot 110 has reached the destination location. Of course, in certain embodiments, the mobile robot 110 may request user input to confirm arrival at either the initial location and/or the destination location.

Regardless, the user authorization may be provided and/or transmitted to the mobile robot 110 through the networking interface 126 via a protected communication protocol. This protected communication protocol may be or include any suitable network security protocol, such as hypertext transfer protocol secure (HTTPS), secure socket layer (SSL), secure file transfer protocol (SFTP), and/or any other network security protocol or combinations thereof. Additionally, or alternatively, the protected communication protocol may be or include encrypting the user authorization in any suitable manner to achieve a secure transfer between the user computing device 120 and the mobile robot 110.

When the mobile robot 110 receives user authorization, the mobile robot 110 may generally localize its position within a facility using the navigation controller 116 in conjunction with a navigation system 150. The navigation system 150 may generally be disposed within a facility, but in certain embodiments, the navigation system 150 may be located at any suitable location inside, outside, or otherwise remote from the facility. The navigation system 150 may include one or more processors 152, one or more memories 154, a networking interface 156, and a set of sensors 155. In particular, the navigation system 150 may span the facility, such that the navigation system 150 may provide the navigation controller 116 with positional data corresponding to any requisite portion(s) of the facility, through which, the mobile robot 110 may need to travel as part of the secure escort function.

For example, the navigation system 150 may include a set of sensors 155 that may monitor and/or otherwise generate positional data 154a corresponding to the interior/exterior portion(s) of the facility. The set of sensors 155 may be or include imaging sensors, global positioning system (GPS) sensors, radio frequency identification (RFID) tags, near-field communication (NFC) tags, ultrasonic sensors, motion sensors, presence sensors, cameras, or other contactless and/or contact-based sensors and combinations thereof used to generate positional data 154a for navigating the facility. In certain embodiments, the positional data 154a may be predetermined and/or determined once, such that the positional data 154a may be stored in the memory 154 may be immediately retrieved by the mobile robot 110 at any time as necessary. In some embodiments, the positional data 154a may be generated by the navigation system 150 on-demand by utilizing the set of sensors 150. For example, the mobile robot 110 may request positional data 154a corresponding to several particular portions of the facility, and the navigation system 150 may capture images of each requested portion of the facility. The navigation system 150 may then process the image data using predetermined navigational algorithms stored in memory 154 configured to localize the mobile robot 110, as well as determine or receive dimensions of each requested portion within a coordinate frame of reference in the facility, such that the navigation system 150 may provide up-to-date positional data 154a to the mobile robot 110 for path planning.

Thus, the positional data 154a may be or include dimensions and/or other position information that the mobile robot 110 may use to determine viable paths to take through a facility when performing a secure escort function. As an example, the positional data 154a may indicate and/or otherwise include data representing a hallway in a hospital, as well as position and orientation of the robot 110 in the hallway within the coordinate frame of reference of the facility. The positional data 154a may indicate that several objects are obstructing the hallway, such that the navigation controller 116 of the mobile robot 110 must plan a path through the hallway that avoids each of these several objects. Accordingly, the navigation controller 116 may receive this positional data from the navigation system 150, plan a travel path through the hallway to the eventual destination location that avoids each of the several objects.

As another example, the positional data 154a received at the navigation controller 116 may be or include data corresponding to multiple locations within and/or outside of the facility that may enable the mobile robot 110 to travel from an initial location to a destination location. The navigation controller 116 may receive this positional data 154a from the navigation system 150, and may determine an optimal path for the mobile robot 110 to travel from the initial location to the destination location based on any suitable parameter. For example, the navigation controller 116 may determine an optimal path based on a planned path that minimizes the travel time from the initial location to the destination location. Alternatively or in addition, the navigation controller 116 may determine an optimal path based on a planned path that minimizes potential encounters with hazardous conditions and/or predetermined obstacles (e.g., wet floors, construction, staircases, closed or closeable doorways, among others), regardless of overall travel time. The navigation controller 1156 may also determine an optimal path based on a planned path that minimizes overall battery 118 charge consumption, to avoid violating a recharge threshold, as discussed herein. Of course, it should be appreciated that the navigation controller 116 may plan a path through a facility based on any suitable parameters or criteria that may correspond to the particular secure escort function.

Additionally, or alternatively, the mobile robot 110 may simply receive and/or otherwise determine an initial location within the facility and a destination location within the facility based on the positional data 154a received from the navigation system 150. The mobile robot 110 may then utilize the sensors 114 to navigate through the facility to reach the destination location. For example, the sensors 114 may include one or more cameras, sound sensors, light detection and ranging (LiDAR) sensors, infrared (IR) sensors, indicia scanners/imagers, RFID readers, NFC readers, microphones, contactless or contact-based sensors and/or any other suitable sensors configured to enable the mobile robot 110 to autonomously navigate through a facility, such as a hospital, a department store, a warehouse, a grocery store, or the like.

In one example, the mobile robot 110 may begin navigating between the initial location to the destination location, and may utilize the one or more cameras to capture image frames (e.g., video or frequent image captures) indicating where the mobile robot 110 is heading. The processor 111 may analyze these captured image frames to determine what objects, obstacles, etc. surround the mobile robot 110. The navigation controller 116 may generate navigation control instructions to guide the mobile robot 110 around and/or otherwise away from any such obstacles to complete the journey between the initial location and the destination location without encountering any stoppages.

In either case, the navigation controller 116 may be configured to enable the processor(s) 111 to cause the mobile robot 110 to autonomously transport high priority items within the electronically securable storage compartment 115 to a destination location. In an embodiment, as those of ordinary skill in the art will understand, the electronically securable compartment 115 may be secured via receipt by the mobile robot 110 of an instruction to lock the compartment 115, which activates an electro-mechanical, battery-powered lock. In such an embodiment, the mobile robot 110 unlocks the electronically securable storage compartment 115, via the battery-powered lock, in response to receiving an unlock command. Alternatively, or in addition, the robot 110 actuates movement of a compartment door or other access control device of the compartment 115 in response to the lock or unlock command. Such an unlock command may be or include, for example, ID verification, payment confirmation, facial or biometric identification of an authorized user, scanning an indicia (barcode, RFID tag, etc.) (e.g., a release barcode could be printed on a receipt and scanned by the mobile robot to release the contents of the electronically securable storage compartment), location-based unlocking, and/or any other suitable command(s) or combinations thereof.

In any event, the navigation controller 116 may include executable instructions that, when executed by the one or more processors 111, may cause the navigation controller 116 to perform actions configured to autonomously navigate the mobile robot 110 to a destination location. Generally, the mobile robot 110 may include transportation components (not shown) such as a motor/engine, wheels, axels, steering components, and brakes. As mentioned, the mobile robot 110 may also include sensors 114 (e.g., cameras, LIDAR, IR sensors, microphone, etc.), a routing/mapping system, and/or any other suitable components configured to assist in the autonomous navigation of the mobile robot 110 to a destination location.

The mobile robot 110 also includes a battery 118 that is configured to provide power to the other components of the mobile robot 110. In certain embodiments, the mobile robot 110 may monitor the battery level to determine whether or not to travel to a charger location to recharge the battery 118. For example, in these embodiments, the mobile robot 110 may establish a recharge threshold, such that the navigation controller 116 instructs the mobile robot 110 to travel to a charger location to recharge a battery of the mobile robot 110 when the battery level is below the recharge threshold. If the one or more processors 111 determine that the recharge threshold is reached while the electronically securable storage compartment 115 is in the stored state, then the one or more processors 111 may instruct the mobile robot 110 to continue to travel to the destination location without recharging when (i) the battery level is at or below the recharge threshold and (ii) sufficient charge is present in the battery to reach the destination location. In such an embodiment, the mobile robot 110 prioritizes timely delivery of the secured item to the destination location by foregoing time to recharge the battery before completion of the delivery task. In an embodiment, after completing delivery of the secured item when the battery falls below the recharge threshold and is deemed insufficient to reach the recharge location, the mobile robot 110 requests assistance from a user (e.g., via a user interface of the robot 110 or by communicating with the user's mobile device) to be manually wheeled to the recharge location. Alternatively, the mobile robot 110 requests assistance of another robot, in its vicinity for example, to dock to the battery terminals of the other robot in order to replenish the battery and enable autonomous travel to the recharge location.

In some embodiments, the mobile robot 110 includes additional systems that may also perform actions that are part of a secure escort function. For example, the mobile robot 110 may perform a secure escort function that includes carrying expensive, restricted access and/or other items for a customer as the customer moves throughout a facility.

Further, in certain embodiments, the mobile robot 110 may perform secure escort functions that involve the mobile robot 110 interacting with a facility component 130. The facility component 130 may be any device or system that is connected to the network 160 and that is related to the facility. For example, the facility component 130 may be a point of sale (POS) station, a digital scale, and/or any other suitable component related to the facility in which the mobile robot 110 is located. In some embodiments, the facility component 130 may include one or more processors 132, one or more memories 134, and a networking interface 136.

As an example, the mobile robot 110 may execute a secure escort function that includes retrieving and carrying a high priority item for a customer in a hardware store. The mobile robot 110 may retrieve the high priority item, and may follow the customer around the hardware store until the customer is ready to check out with their items. The mobile robot 110 may reach a POS station with the customer, and the mobile robot 110 may communicate with the POS station to indicate that the customer intends to purchase the high priority item, such that the POS station may charge the customer for the high priority item without the customer having to scan the high priority item. The mobile robot 110 may continue to hold the high priority item (e.g., in the electronically securable storage compartment 115) until the POS station transmits confirmation that the customer actually paid for the high priority item. When the mobile robot 110 receives the payment confirmation from the POS station, the mobile robot 110 may release the high priority item for retrieval by the customer.

However, in certain embodiments, the mobile robot 110 may also interact with known and/or unknown users/individuals within the facility during secure escort functions. For example, when the mobile robot 110 receives user authorization, the mobile robot 110 may require visual confirmation that the user providing the authorization corresponds to the expected user or one of an expected set of users that may provide authorization for certain secure escort functions. To illustrate, the mobile robot 110 may receive authorization to securely transport medication from an initial location in a hospital to a destination location in the hospital where the patient is located. Prior to securing the medication in the electronically securable storage compartment 115 and navigating through the hospital, the mobile robot 110 may utilize one or more imaging devices (e.g., included in the sensors 114) to capture images of the user providing the authorization. The mobile device 110 may then execute a facial recognition algorithm on the captured images via the one or more processors 111 to verify that the user is a known user with authority to authorize such a secure escort function to deliver the medication.

In another example, the mobile robot 110 may be located in a warehouse where items are loaded and/or unloaded from boxes, shelves, trucks, etc. The mobile robot 110 may be assigned to securely dispense items from the electronically securable storage compartment as part of a picking operation. In particular, the mobile robot 110 may store different groups of picked products within the electronically securable storage compartment 115, and the mobile robot 110 may unlock the compartment 115 when the mobile robot 110 confirms that it is in the destination location for packing or placement of the picked products in a truck for transport. Before a user is able to remove a product from the electronically securable storage compartment 115, the mobile robot 110 may verify with the facial recognition algorithm that the user is included on the list of users who may be authorized to pack the products from the mobile robot 110. Additionally, or alternatively, the mobile robot 110 may utilize the cameras to monitor open shelves and thereby ensure that no unauthorized users are taking, tampering, and/or otherwise touching products.

In either case, the mobile robot 110 may determine through facial recognition that an unauthorized user is attempting to interfere with the secure escort function, and the mobile robot 110 may then send the video feed or captured frames of the unauthorized users to security personnel, secure any products within the electronically securable storage compartment 115 (e.g., enter the stored state) and sound an alarm or alert (e.g., via user interface 119 and/or I/O interface 109), follow the unauthorized user in question while sounding an alert, and/or any other suitable remediation action or combinations thereof.

When determining whether or not a user is an authorized and/or otherwise recognized user as part of a secure escort function, the mobile robot 110 may communicate with a facility server 140 that includes information/data corresponding to users within the facility. For example, the facility server 140 may include facial recognition data corresponding to authorized users in the facility stored in memory 144. In certain embodiments, the mobile device 110 may capture image data corresponding to a face of a user, and the mobile device 110 may transmit the captured image data to the facility server 140 via the respective networking interfaces 113, 146. The facility server 140 may receive the captured image data, and may proceed to execute a facial recognition algorithm via the one or more processors 142 to determine whether or not the user represented in the captured image data corresponds to a known/authorized user. The facility server 140 may subsequently transmit any determination back to the mobile robot 110 to enable the mobile robot 110 to either permit or deny the user access to products/items stored in the electronically securable storage compartment 115. Further, the facility server 140 may provide instructions as part of the facial recognition algorithm that cause the mobile robot 110 to permit or deny the user access to the products/items stored in the electronically securable storage compartment 115.

More generally speaking, the one or more memories 112, 124, 134, 144, 154 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The one or more memories 112, 124, 134, 144, 154 may also store an operating system (OS) (e.g., Microsoft Windows, Linux, UNIX, etc.) capable of facilitating the functionalities, apps, methods, or other software as discussed herein. In addition, the one or more memories 112, 124, 134, 144, 154 may also store machine readable instructions, including any of one or more application(s) (e.g., a facial recognition algorithm, as described herein), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, a facial recognition algorithm or component, where each may be configured to facilitate their various functionalities discussed herein. It should be appreciated that one or more other applications may be envisioned and that are executed by the one or more processors 111, 122, 132, 142, 152.

Each of the one or more processors 111, 122, 132, 142, 152 may be connected to the one or more memories 112, 124, 134, 144, 154 via a computer bus responsible for transmitting electronic data, data packets, or otherwise electronic signals to and from the one or more processors 111, 122, 132, 142, 152 and the one or more memories 112, 124, 134, 144, 154 in order to implement or perform the machine readable instructions, methods, processes, elements or limitations, as illustrated, depicted, or described for the various flowcharts, illustrations, diagrams, figures, and/or other disclosure herein. Of course, each of the one or more processors 111, 122, 132, 142, 152 may include any suitable number of processors and/or processor types. For example, the one or more processors 111, 122, 132, 142, 152 may include one or more CPUs and one or more graphics processing units (GPUs). Generally, each of the one or more processors 111, 122, 132, 142, 152 may be configured to execute software instructions stored in each of the corresponding one or more memories 112, 124, 134, 144, 154.

The one or more processors 111, 122, 132, 142, 152 may interface with the one or more memories 112, 124, 134, 144, 154 via the computer bus to execute an operating system (OS). The one or more processors 111, 122, 132, 142, 152 may also interface with the one or more memories 112, 124, 134, 144, 154 via the computer bus to create, read, update, delete, or otherwise access or interact with the data stored in the one or more memories 112, 124, 134, 144, 154 and/or any external database (not shown) (e.g., a relational database, such as Oracle, DB2, MySQL, or a NoSQL based database, such as MongoDB). The data stored in the one or more memories 112, 124, 134, 144, 154 and/or an external database may include all or part of any of the data or information described herein, including, for example, captured image data (e.g., as collected by the mobile robot 110), indicia data, RFID tag data, positional data, and/or other information or combinations thereof, and as otherwise described herein.

The user interface 119 may provide a display screen. The mobile robot 110 may also provide an I/O interface 109 that includes one or more I/O components (e.g., ports, capacitive or resistive touch sensitive input panels, keys, buttons, lights, LEDs), which may be directly accessible via, or attached to, the mobile robot 110 or may be indirectly accessible. According to some embodiments, an authorized user may access the mobile robot 110 via the user interface 119 and I/O interface 109 to review information, make changes, input user authentication, initiate a secure escort function, provide confirmation that the mobile robot 110 is at an initial/destination location, and/or perform other functions or combinations thereof.

Each of the mobile robot 110, the user computing device 120, the facility component 130, the facility server 140, and the navigation system 150 may be communicatively coupled together via the network 160 and the respective networking interfaces 113, 126, 136, 146, 156. The network 160 may be a single communication network, or may include multiple communication networks of one or more types (e.g., one or more wired and/or wireless local area networks (LANs), and/or one or more wired and/or wireless wide area networks (WANs), such as the internet).

The networking interface 113 may enable the mobile robot 110 to communicate with the user computing device 120, the facility component 130, the facility server 140, the navigation system 150, and/or any other suitable devices or combinations thereof. More specifically, the networking interface 113 enables the mobile robot 110 to communicate with each component of the example system 100 across the network 160 through their respective networking interfaces 113, 126, 136, 146, 156. The networking interfaces 113, 126, 136, 146, 156 may support wired or wireless communications, such as USB, Bluetooth, Wi-Fi Direct, near-field communication (NFC), etc. The networking interfaces 113, 126, 136, 146, 156 may allow the components of the example system 100 to communicate with the various other components of the example system 100 via a wireless communication network such as a fifth-, fourth-, or third-generation cellular network (5G, 4G, or 3G, respectively), a Wi-Fi network (802.11 standards), a WiMAX network, a wide area network (WAN), a local area network (LAN), etc.

Additionally, or alternatively, in some embodiments, the facility server 140 and/or other connected server(s) (not shown) may perform some, all, or portions of the functionalities as discussed herein as part of a "cloud" network or may otherwise communicate with other hardware or software components within the cloud to send, retrieve, or otherwise analyze data or information described herein.

It will be understood that the above disclosure is one example and does not necessarily describe every possible embodiment. As such, it will be further understood that alternate embodiments may include fewer, alternate, and/or additional steps or elements.

Figure 2:
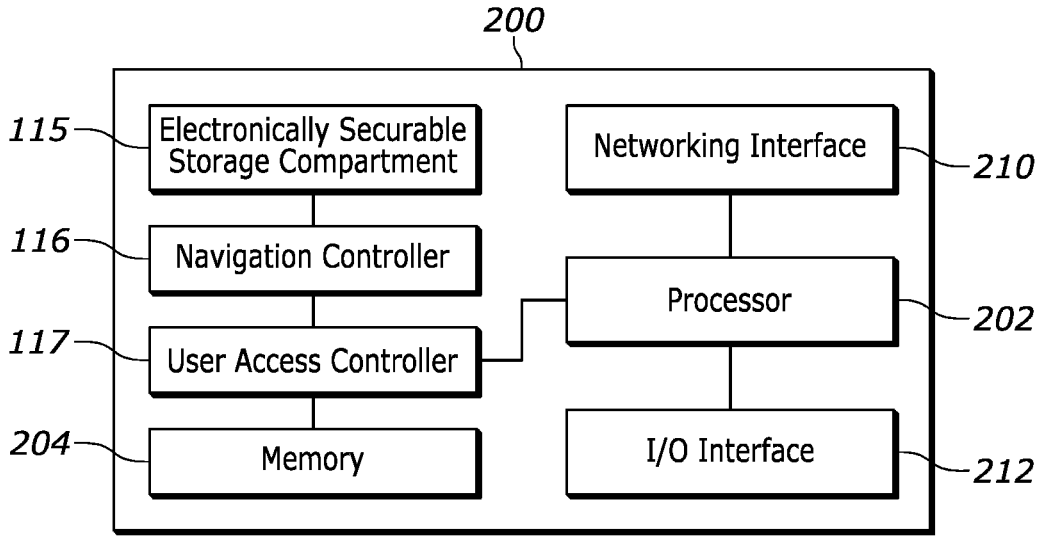
FIG. 2 is a block diagram of an example logic circuit for implementing example methods and/or operations described herein.

FIG. 2 is a block diagram representative of an example logic circuit capable of implementing, for example, one or more components of the example mobile robot 110 of FIG. 1. The example logic circuit of FIG. 2 is a processing platform 200 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 200 of FIG. 2 includes a processor 202 such as, for example, one or more microprocessors, controllers, and/or any suitable type of processor. The example processing platform 200 of FIG. 2 includes memory (e.g., volatile memory, non-volatile memory) 204 accessible by the processor 202 (e.g., via a memory controller). The example processor 202 interacts with the memory 204 to obtain, for example, machine-readable instructions stored in the memory 204 corresponding to, for example, the operations represented by the flowcharts of this disclosure.

The memory 204 and processor 202 are also connected to the electronically securable storage compartment 115, the navigation controller 116, and the user access controller 117. As previously mentioned, the navigation controller 116 and the user access controller 117 may include executable instructions configured to, for example, control a mobile robot (e.g., mobile robot 110) to escort high priority items. To illustrate, the example processor 202 may execute the user access controller 117 when beginning a secure escort function, and may determine to switch the electronically securable storage compartment 115 from the accessible state to the stored state. Accordingly, the processor 202 may transmit instructions to the electronically securable storage compartment 115 that cause the electronically securable storage compartment 115 to actuate a lid, cover, compartment door, and/or other suitable security mechanism into a closed position such that the contents within the compartment 115 are inaccessible to individuals.

Additionally, or alternatively, machine-readable instructions corresponding to the example operations described herein may be stored on one or more removable media (e.g., a compact disc, a digital versatile disc, removable flash memory, etc.) that may be coupled to the processing platform 200 to provide access to the machine-readable instructions stored thereon.

The example processing platform 200 of FIG. 2 also includes a network interface 210 to enable communication with other machines via, for example, one or more networks. The example network interface 210 includes any suitable type of communication interface(s) (e.g., wired and/or wireless interfaces) configured to operate in accordance with any suitable protocol(s) (e.g., Ethernet for wired communications and/or IEEE 802.11 for wireless communications).

The example, processing platform 200 of FIG. 2 also includes input/output (I/O) interfaces 212 to enable receipt of user input and communication of output data to the user. Such user input and communication may include, for example, any number of keyboards, mice, USB drives, optical drives, screens, touchscreens, etc.

Figure 3A:
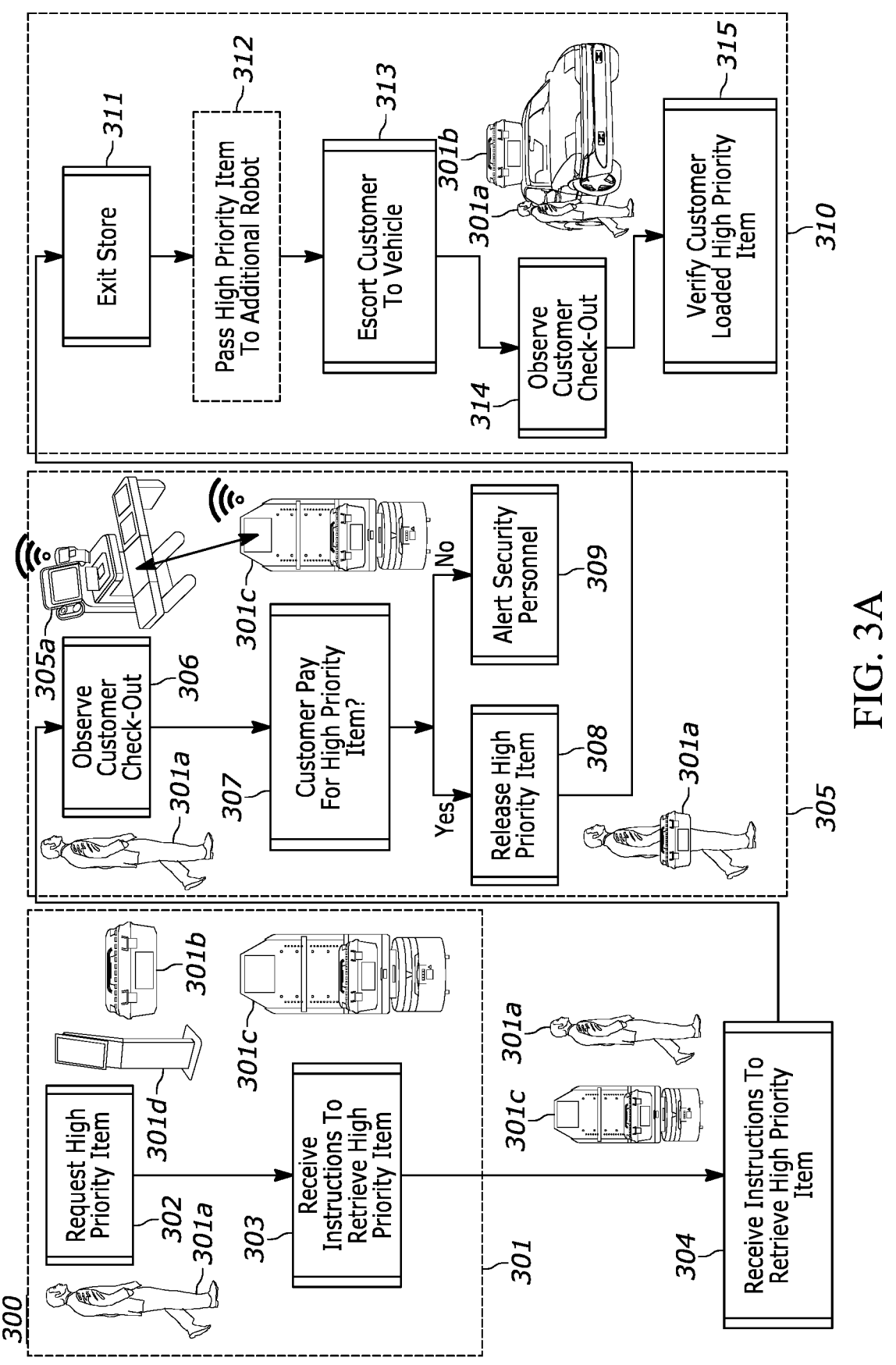
FIG. 3A is a first exemplary flow diagram of the mobile robot operating as a customer escort when the customer has high priority items, in accordance with embodiments described herein.

FIG. 3A is a first exemplary flow diagram 300 of the mobile robot 301c operating as a customer escort when the customer 301a has high priority items (e.g., high priority item 301b), in accordance with embodiments described herein. Generally, the first exemplary flow diagram 300 may represent a customer 301a requesting to purchase a high priority item 301b at a store (e.g., hardware store), the mobile robot 301c escorting the customer to a POS station 305a with the high priority item 301b, and the mobile robot 301c releasing the high priority item 301b to the customer 301a. It should be understood that each of these actions may take place in numerous ways, and the mobile robot 301c may perform fewer or additional functionality as part of the overall secure escort function illustrated in the first exemplary flow diagram 300.

At the first instruction sequence 301, the customer 301a may indicate that they desire to purchase the high priority item 301b, and the mobile robot 301c may activate the secure escort function in response to the customer's 301a indication. Namely, at block 302, the customer 301a may request the high priority item 301b by interfacing with a kiosk 301d or other suitable interface. The customer 301a may input a request at the kiosk 301d for the mobile robot 301c to travel to the customer's 301a current location and/or the location of the high priority item 301b. For example, and in certain embodiments, the customer 301a may approach and interact with an employee, a kiosk 301d, and/or a display of the mobile robot 301c, and the customer 301a may request the high priority item they want to purchase.

At block 303, the mobile robot 301c may receive the instructions from the kiosk 301d across a network (e.g., network 160), and the mobile robot 301c may proceed to travel to the required location to retrieve the high priority item. In certain embodiments, when the mobile robot 301c arrives at the customer's 301a location and/or the location of the high priority item 301b, the mobile robot 301c may independently retrieve the high priority item 301b. Additionally, or alternatively, when the mobile robot 301c arrives at the customer's 301a location and/or the location of the high priority item 301b, a store employee may load the high priority item 301b into the mobile robot 301c for secure escort with the customer 301a.

In certain embodiments, the mobile robot 301c may be equipped with one or more cameras (e.g., sensors 114) that may capture the customer's 301a face to perform facial recognition on the captured image of the customer's 301a face. Thereafter, the mobile robot 301c may track and/or otherwise reference the captured image to ensure that the mobile robot 301c is following and/or otherwise interacting with the same customer 301a. Further, in embodiments where the mobile robot 301c is equipped with an indicia scanner or RFID reader, the mobile robot 301c may also capture a universal product code (UPC) or RFID code associated with the high priority item 301b to track and/or otherwise ensure that the high priority item remains within the mobile robot's 301c electronically securable storage compartment 115 or is otherwise in a known location prior to the customer 301a purchasing the high priority item 301b.

In some embodiments, the mobile robot 301c may also capture images of and/or otherwise check a customer's 301a license or other proof of identification to ensure that the customer 301a is authorized to purchase any high priority items 301b that may be restricted (e.g., power tools, alcohol, etc.). The mobile robot 301c may also use one or more cameras to compare the customer's 301a face against the photo on their license or ID for additional verification.

Similarly, in certain embodiments, the mobile robot 301c may associate expensive or other high priority items 301b with the customer's 301a license or credit card by capturing images of the license or credit card and extracting relevant information (e.g., credit card number, expiration date, CVV, etc.). In these embodiments, the mobile robot 301c may then require the customer 301a to return the high priority item 301b to an appropriate area (e.g., relevant shelf within the store) or else be charged for the high priority item 301b at the POS station 305a and/or automatically by the mobile robot 301c communicating the credit card information to a store server (e.g., facility server 140) for processing.

Thereafter, at block 304, the mobile robot 301c may escort the customer 301a around the store with the high priority item 301b stored within an electronically securable storage compartment (e.g., electronically securable storage compartment 115). However, in certain instances, the mobile robot 301c may not follow and/or otherwise escort the customer 301a around the store until the customer 301a is prepared to check out at a POS station 305a. Instead, the mobile robot 301a may meet the customer 301a at the POS station 305a when the customer 301a is prepared to check out with the high priority item 301b.

In some embodiments, the mobile robot 301c may also be used for scanning additional items and stowing them for the customer 301a as part of the customer's 301a overall shopping experience. For example, the mobile robot 301c may be equipped with one or more cameras and a barcode imager, and may proceed to record items that a customer 301a intends to purchase, and the mobile robot 301c may subsequently upload/transfer that data to a POS station 305a when the customer 301a reaches the POS station 305a. In certain embodiments, the mobile robot 301c may also automatically charge the credit card of the customer 301a without the customer 301a being required to travel through a POS station 305a, to further increase the efficiency of the customer's 301a overall shopping experience.

In certain embodiments, the mobile robot 301c may be equipped with a microphone to listen to the customer's 301a voice. For example, if the customer 301a says that they do not want the high priority item 301b at some point during their shopping experience, the mobile robot 301c may securely and autonomously bring the high priority item 301b back to the appropriate location within the store. The mobile robot 301c may also listen to a conversation held by the customer 301a to detect keywords that may be indicative of an intent to steal and/or hand off the high priority item 301b to unauthorized individuals (e.g., underage minors). In response, the mobile robot 301c may trigger alerts/mitigations and/or retain the video/audio feeds for later investigation. Such mitigations and/or alerts may include, for example, capturing images/video of the customer 301a or other individual(s), following the customer 301a and/or other individual(s) to the storefront door or to a vehicle to obtain license plate information, broadcasting a loud announcement over an integrated and/or otherwise connected speaker system, audibly/visibly notifying the customer 301a and/or other individuals that they did not pay for the high priority item 301b, audibly/visually alerting a guard or other personnel by showing a picture of the customer 301a that did not pay on the display of the mobile robot 301c or sending an alert to a user computing device (e.g., user computing device 120) of a guard or other personnel, communicating with exit doors of the store to prevent the exit doors from opening for the customer 301a and/or other individual(s), broadcasting a signal to deactivate an electronic device being taken by the customer 301a and/or other individual(s), and/or any other suitable mitigation and/or alerts or combinations thereof.

Moreover, while traveling to the POS station 305a, the mobile robot 301c may also detect if the high priority item 301b is removed from the electronically securable storage compartment 115 by the customer 301a before reaching the point of sale. If this is detected, the mobile robot 301c may trigger one or more mitigations and/or alerts, and the mobile robot 301a may also record any individuals the high priority item 301b may have been passed to, and/or the location the high priority item 301b was left in and/or otherwise last detected. In these circumstances, the one or more cameras on the mobile robot 301c may recognize the high priority item 301b being removed with object recognition, and/or the mobile robot 301c may detect that the RFID tag is no longer present. Additionally, or alternatively, the mobile robot 301c may be equipped with a scale to detect that the weight of the high priority item has been removed prematurely from the mobile robot 301c. Namely, the mobile robot 301c may include a precision scale beneath and/or otherwise disposed near the electronically securable storage compartments 115 to ensure more weight is not removed than expected.

In some embodiments, the mobile robot 301c may also monitor a customer's 301a path throughout a store in order to provide a better understanding of which aisles may be traversed more frequently than others and where inventory may be taken from more regularly. In this manner, the mobile robot 301c may provide customer path data that may enable retailers to better predict where restocking is needed most, find bottlenecks in their store layout, and even detect when a customer 301a needs help and get that customer 301a a remote customer service technician or mobile robot 301c that can assist them.

Regardless, at the second instruction sequence 305, the customer 301a may begin checkout at the POS station 305a at block 306. While the customer 301a is checking out, at block 307, the mobile robot 301c may connect to, interface with, and/or otherwise communicate with the POS station 305a. As part of this communication, the mobile robot 301c may check that the high priority item 301b is paid for by the customer 301a during the check-out sequence. To assist in this effort, the mobile robot 301*c* may automatically send the high priority item UPC(s) to the POS station 305*a* to automatically add the UPC(s) to the customer's 301*a* transaction without requiring the customer 301*a* to scan a barcode or other indicia of the high priority item 301*b*.

In some embodiments, when the mobile robot 301*c* determines that the customer 301*a* has paid for the high priority item 301*b* (Yes branch of block 307), the mobile robot 301*c* may release the high priority item 301*b* to the customer 301*a* at block 308 (e.g., accessible state of the electronically securable storage compartment 115). On the other hand, if the customer 301*a* attempts to finish the check-out sequence at the POS station 305*a* without paying for the high priority item 301*b* (No branch of block 307), then the mobile robot 301*c* may ensure that the high priority item 301*b* is secured (e.g., stored state of the electronically securable storage compartment 115), and the mobile robot 301*c* may also alert security personnel or other employees of the store (block 309).

As previously mentioned, the mobile robot 301*c* may also check that the customer 301*a* is authorized to purchase certain high priority items 301*b* that may require additional credentials/licenses, etc. For example, the customer 301*a* may be attempting to purchase a controlled substance such as alcohol, and as a result, the mobile robot 301*c* may request that the customer 301*a* present adequate identification. In this scenario, the mobile robot 301*a* may further alert store personnel to be present at the POS station 305*a* in order to ensure that the customer 301*a* presented adequate identification during checkout. Additionally, or alternatively, the POS station 305*a* may also include a camera that may capture images of a customer 301*a* and/or any authorizing credentials to confirm/verify that the customer 301*a* identified by the mobile robot 301*c* is paying for the high priority item 301*a* (e.g., using facial recognition).

When the customer 301*a* completes the check-out sequence at the POS station 305*a*, the customer 301*a* may proceed to take the high priority item 301*b* and leave the store (block 311).

Thus, in the third instruction sequence 310, the mobile robot 301*c* may simply leave the customer 301*a* to take the high priority item 301*b* to their vehicle and/or otherwise leave with the high priority item. However, in certain embodiments, the first exemplary flow diagram 300 may proceed from block 307 to block 312, such that the mobile robot 301*c* may pass the high priority item to another mobile robot that is configured to escort the customer 301*a* to their vehicle with the high priority item once the customer 301*a* has completed the check-out process and paid for the high priority item 301*b*.

If the mobile robot 301*c* does not transfer the high priority item 301*b* to another mobile robot for transportation to the customer's 301*a* vehicle, the mobile robot 301*c* may escort the customer 301*a* to their vehicle with the high priority item 301*b* (block 313). When the mobile robot 301*c* and the customer 301*a* reach the customer's 301*a* vehicle (block 314), the mobile robot 301*c* may view the customer 301*a* loading the high priority item into the vehicle. As a result, the mobile robot 301*c* may determine whether or not the customer 301*a* successfully loaded the high priority item 301*b* into their vehicle (block 315).

In the event that the customer 301*a* is unsuccessful at loading the high priority item 301*b* into their vehicle, the mobile robot 301*c* may, for example, autonomously assist the customer 301*a* to load the high priority item 301*b* into the vehicle and/or may alert store employees to assist the customer 301*a* loading the high priority item 301*b* into the customer's 301*a* vehicle. Additionally, or alternatively, the mobile robot 301*c* may carry items to the customer's 301*a* vehicle to make sure that the customer 301*a* does not transfer the high priority item 301*b* to a different, potentially unauthorized individual. In the event that the mobile robot 301*a* detects such a transfer, the mobile robot 301*c* may perform one or more of the mitigations and/or alerts described herein.

Figure 3B:
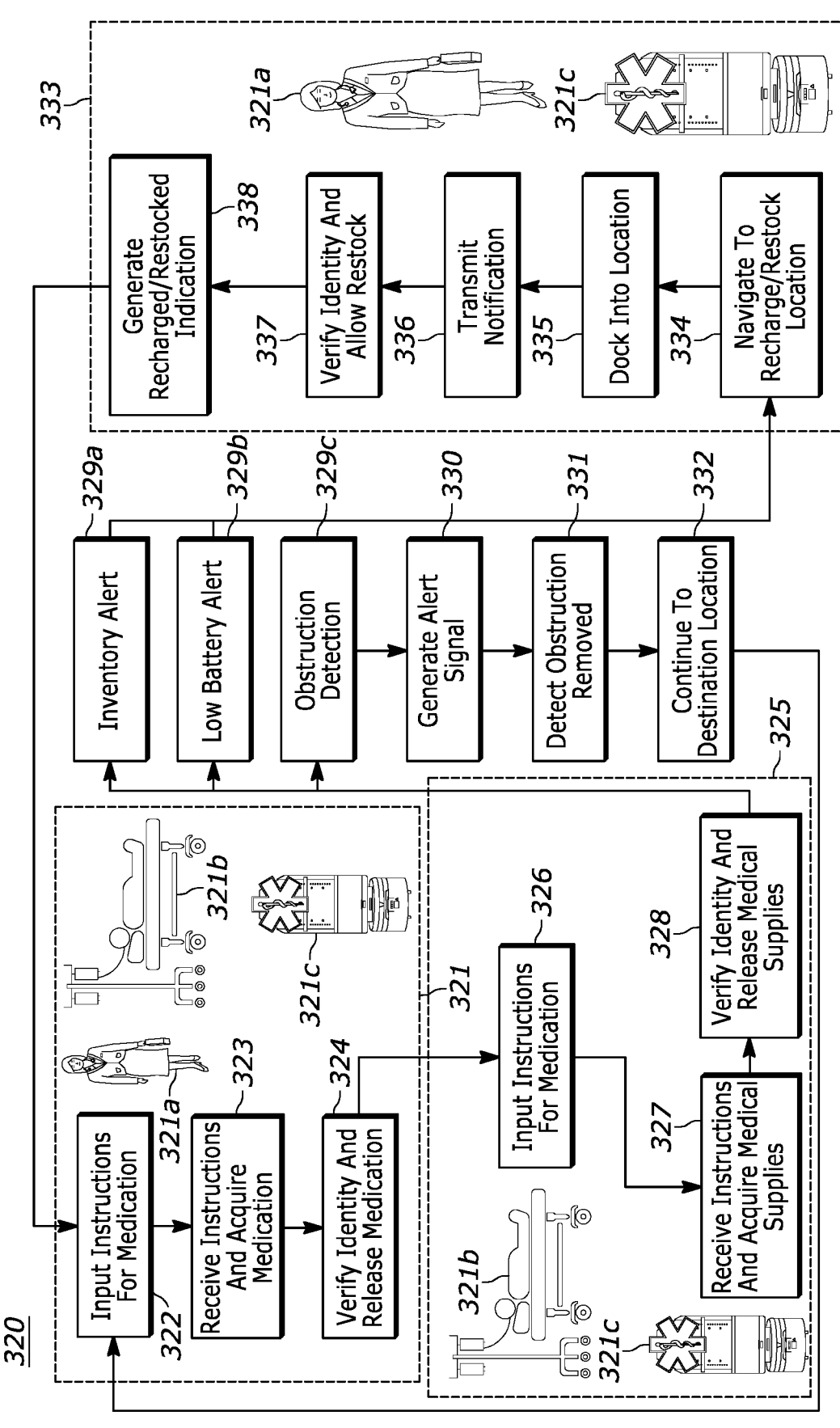
FIG. 3B is a second exemplary flow diagram of the mobile robot operating as an escort for high priority items, in accordance with embodiments described herein.

FIG. 3B is a second exemplary flow diagram 320 of the mobile robot 321*c* operating as an escort for high priority items, in accordance with embodiments described herein. Generally, the second exemplary flow diagram 320 may represent a medical service provider 321*a* (e.g., nurse, doctor, etc.) requesting that the mobile robot 321*c* escorting medication to a patient 321*b*, the medical service provider 321*a* requesting that the mobile robot 321*c* escorts medical supplies to the patient's 321*b* room, and the mobile robot 321*c* charging a battery (e.g., battery 118) prior to restocking items for the medical service provider 321*a*. It should be understood that each of these actions may take place in numerous ways, and the mobile robot 321*c* may perform fewer or additional functionality as part of the overall secure escort functions illustrated in the second exemplary flow diagram 320.

At the first instruction sequence 321, the medical service provider 321*a* may interface with the mobile robot 321*c* or other suitable interface to request that the mobile robot 321*c* brings medication for the patient 321*b* (block 322). At block 323, the mobile robot 321*c* may receive the instructions from the medical service provider 321*a*, and the mobile robot 321*c* may proceed to acquire the medication, secure the medication in a secure location (e.g., stored state of the electronically securable storage compartment 115), and navigate through the facility (e.g., hospital) to the destination location (e.g., patient's 321*b* room). When the mobile robot 321*c* reaches the destination location, the mobile robot 321*c* may verify the identity of the medical service provider 321*a* and the patient 321*b*, and the mobile robot 321*c* may then release the medication from the secured location (block 324). For example, the mobile robot 321*c* may utilize facial recognition to verify the identity of the medical service provider 321*a*, the patient 321*b*, and/or any other individual(s) involved in the secure escort function.

In certain embodiments, the mobile robot 321*c* may include multiple secure compartments to be used for different medications or medication groups. When the mobile robot 321*c* arrives at the destination location, the appropriate secure compartment may open to dispense the appropriate medication in response to a verification procedure. These verification procedures may include, without limitation, scanning the patient's 321*b* wristband or medical service provider's 321*a* ID (e.g., RFID, NFC, etc. scanner being wirelessly connected to the mobile robot 321*c* or otherwise attached/associated with the mobile robot 321*c*), performing facial recognition on the patient's 321*b* and/or the medical service provider's 321*a* face to make sure the correct patient 321*b* and medical service provider 321*a* are present, checking the bed ID, room number, or hallway location (e.g., for overflow) to make sure the mobile robot 321*c* is at the correct destination location.

To enhance security and control of administering medications that include controlled substances, for example, in some embodiments, the mobile robot 321*c* may be configured to keep the electronically securable storage compartment 115 open only during a predetermined time interval, such as during an estimated or predetermined time required for medication administration to the patient 321*b*. In such an embodiment, upon expiration of the time interval required to administer the medication, the mobile robot automatically prompts the medical personnel to place the medication back into the storage compartment 115 and, upon confirming that the medication has been replaced, locks the electronically securable storage compartment 115 for secure transport. In an embodiment, the mobile robot confirms that the medication has been replaced automatically, such as by activating an internal barcode scanner or camera within the compartment 115 to detect presence of the medication. Alternatively, or in addition, the mobile robot prompts the medical personnel to enter their credentials in order to confirm that the medication is placed back into the secured compartment 115 upon expiration of the predetermined timer discussed above. The timer discussed above may be overridden by a medical service provider 321a scanning their badge, and the mobile robot 321c may maintain a record of the overriding. Additionally, or alternatively, the mobile robot 321c may record interactions between the patient 321b and the medical service provider 321a at the time of medication administration or electronically securable storage compartment 115 unlock (e.g., accessible state) in the event that subsequent review is required. Moreover, the mobile robot 321c may blur the patient's 321b and medical service provider's 321a faces using facial recognition to ensure privacy.

In certain embodiments, the mobile robot 321c may verify that the mobile robot 321c is in the destination location based on an internal or external telemetry unit associated with the patient 321b. Additionally, or alternatively, the mobile robot 321c may utilize a wireless locationing system in the hospital (e.g., navigation system 150) and/or the one or more cameras in the mobile robot 321c may capture image data of a bed marker near the patient's 321b bed or near the room's doorway. The mobile robot 321c may also scan and/or otherwise decode a QR code or other indicia that is disposed on the bed marker/number to determine whether or not the mobile robot 321c has reached the destination location.

As another example, the second instruction sequence 325 may represent a secure escort function where the mobile robot 321c is tasked with retrieving and delivering medical supplies to the patient's 321b room. For example, the patient 321b may be contaminated with a highly communicative disease and/or other condition that may risk the health and safety of medical service providers 321a. Thus, to avoid potential contamination, the medical service provider 321a may instruct the mobile robot 321c to retrieve and deliver the medical supplies directly to the patient 321b without requiring the medical service provider 321a and/or other individuals to interface directly with the contagious patient 321b.

In particular, at block 326, the medical service provider 321a may interface with the mobile robot 321c or other suitable interface to request that the mobile robot 321c brings the medical supplies to the patient's 321b room. At block 327, the mobile robot 321c may receive the instructions from the medical service provider 321a, and the mobile robot 321c may proceed to acquire the medical supplies, secure the medical supplies in a secure location (e.g., stored state of the electronically securable storage compartment 115), and navigate through the hospital to the destination location (e.g., patient's 321b room). When the mobile robot 321c reaches the destination location, the mobile robot 321c may verify the identity of the patient 321b, and the mobile robot 321c may then release the medical supplies from the secured location (block 328). For example, the mobile robot

321c may utilize facial recognition to verify the identity of the patient 321b and/or any other individual(s) involved in the secure escort function.

In certain embodiments, the mobile robot 321c may be equipped with a telepresence screen (e.g., via user interface 119) to facilitate a two-way connection with the medical service provider 321a. After exposure to a contaminated patient 321b, the mobile robot 321c may be directed to a decontamination area where the mobile robot 321c may be sprayed, exposed to UV, and/or sterilized by hand. In certain embodiments, the mobile robot 321c may be able to perform more complicated functions that are normally performed by a medical service provider 321a, such as rolling patients or repositioning ventilator masks on patients. In circumstances where presence of medical service providers 321a is limited, such providers 321a may log in to a mobile robot 321c remotely from other facilities that have more providers 321a (e.g., from a different state, province, district, etc.) to help supplement the lack of medical service providers 321a.

As illustrated in FIG. 3B, the second exemplary flow diagram 320 may then proceed to a set of alerts/detections that may trigger subsequent actions by the mobile robot 321c. Of course, it should be understood that any of these alerts/detections may be triggered and/or otherwise encountered by the mobile robot 321c at any time, and may not necessarily follow from the second instruction sequence 325. For example, the mobile robot 321c may experience an inventory alert 329a at block 233, block 324, block 327, block 328, and/or any other suitable time during a secure escort function.

Generally, the set of alerts/detections includes an inventory alert 329a, a low battery alert 329b, and an obstruction detection 329c. The inventory alert 329a may generally indicate that the contents within the mobile robot 321c (e.g., within the electronically securable storage compartment 115) have been tampered with and/or otherwise altered in some manner, such as by an individual removing some/all of the contents. For example, the mobile robot 321c may include one or more cameras pointed downward to ensure that no more medical supplies or medications are removed than are needed for a given situation. Additionally, or alternatively, and as previously mentioned, the mobile robot 321c may include a precision scale beneath, within, and/or otherwise disposed near the electronically securable storage compartments 115 to ensure more weight is not removed than expected. For example, the precision scale may sense weight differences (e.g., sensitive to within 0.1 grams (g), 0.01 g, etc.) in medication containers to ensure that a patient does not accidentally or purposely take too many pills or extra items that are not intended/authorized for their use. The low battery alert 329b may generally indicate that the battery level of the mobile robot 321c has crossed a recharge threshold, such that the mobile robot 321c should proceed to a charger location to recharge the battery. The obstruction detection 329c may generally indicate that the mobile robot 321c has encountered an obstruction, such as a closed door, during travel from the initial location to the destination location.

As a result of the mobile robot 321c generating an obstruction detection 329c, the mobile robot 321c may also generate an alert signal to a workstation or user computing device (e.g., user computing device 120) of a medical service provider 321a (block 330) and/or at the user interface screen of the mobile robot. The medical service provider 321a may then walk to the current location of the mobile robot 321c, and may remove the obstruction (e.g., open a previously closed door along the travel path, including at the patient room destination) from the path of the mobile robot 321c (block 331). When the mobile robot 321c determines that the obstruction is no longer present, the mobile robot 321c may continue traveling through the hospital to reach the destination location (block 332). It should be understood that, while the second exemplary flow diagram 320 illustrates block 332 proceeding back to block 322, block 332 may represent an ending point for an instruction sequence, such that the mobile robot 321c may proceed to a destination location without necessarily receiving a subsequent secure escort function.

When the mobile robot 321c generates either the inventory alert 329a and/or the low battery alert 329b, the mobile robot 321c may proceed to the third instruction sequence 333 by navigating to a charger location and/or a restocking location (block 334). The mobile robot 321c may then dock into a charger location (block 335), and/or the mobile robot 321c may transmit a notification to a medical service provider 321a to restock the mobile robot 321c (block 336).

When the medical service provider 321a arrives to restock the mobile robot 321c, the mobile robot 321a may verify the identity of the medical service provider 321a prior to allowing the medical service provider 321a to restock the mobile robot 321c (block 337). When the medical service provider 321a completes the restock of the mobile robot 321c, the mobile robot 321c may generate and/or transmit an indication (e.g., to user computing devices 120) that the mobile robot 321c is recharged/restocked and is ready to receive additional secure escort functions (block 338). It should be understood that, while the second exemplary flow diagram 320 illustrates block 338 proceeding back to block 322, block 338 may represent an ending point for an instruction sequence, such that the mobile robot 321c may proceed to a destination location without necessarily receiving a subsequent secure escort function.

Thus, in certain embodiments, the mobile robot 321c may track its inventory as the mobile robot 321c completes secure escort functions, and the mobile robot 321c may return to a restocking location when it needs to be restocked. Additionally, if the electronically securable storage compartment 115 is not properly closed, the mobile robot 321c may proceed to the nearest medical service provider 321a for assistance closing the compartment 115, record video footage of the compartment 115 until the compartment 115 is closed to ensure nothing else is removed, return to a safe zone until a repair can be affected, and/or any other suitable security measure or combinations thereof. In certain embodiments, the mobile robot 321c may also automatically close the electronically securable storage compartment 115 after a threshold time period has elapsed. In these embodiments, the mobile robot 321c may also trigger/execute one or more of the mitigations and/or alerts described herein if something is preventing self-closure of the compartment 115.

It should be appreciated that the example scenarios and flow diagrams 300, 320 illustrated in FIGS. 3A and 3B are merely representative of a variety of scenarios in which a mobile robot 301c, 321c may be implemented. For example, the mobile robot 301c, 321c may be used in a warehouse scenario with pick and pack to ensure that no high priority items are removed from the mobile robot 301c, 321c before the high priority items are packed in a box or placed on a truck. The mobile robot 301c, 321c may use secure compartments (e.g., electronically securable storage compartment 115) to store different groups of picked products, and the mobile robot 301c, 321c may unlock the compartment(s)

115 when the mobile robot 301c, 321c arrives at the destination location for packing or placement in a truck for transport.

Additionally, or alternatively, the one or more cameras on the mobile robot 301c, 321c may monitor open shelves on and/or within the mobile robot 301c, 321c to ensure that individuals are not touching, tampering, and/or otherwise taking items out of the shelves. If such touching, tampering, and/or taking is detected, the mobile robot 301c, 321c may send a captured video feed of the incident to security personnel, stop and sound an alarm or alert, follow the individual in question while sounding an alert, and/or any other suitable security measures or combinations thereof.

Moreover, the mobile robot 301c, 321c with secure compartments (e.g., electronically securable storage compartment 115) may be used in environments where confidential or high value items are being transported and delivered. In these environments, the mobile robot 301c, 321c may authenticate recipients based on a badge ID, biometrics, facial recognition, voice recognition, location (e.g., an office), and/or any other suitable authentication parameter or combinations thereof. For example, the mobile robot 301c, 321c may be utilized to transport and/or otherwise deliver mail to restricted areas when many mailroom employees do not have authorization to enter the restricted area.

FIG. 4 is a flowchart representative of a method 400 for controlling a mobile robot (e.g. mobile robot 110) to escort high priority items (e.g., 301b), in accordance with embodiments described herein. The method 400 describes various methods for controlling a mobile robot to escort high priority items. However, generally speaking, the method 400 for controlling a mobile robot to escort high priority items includes receiving a user authorization for access to an electronically securable storage compartment, localizing the mobile robot within a facility to determine an initial location and a destination location, entering the compartment into a stored state at the initial location, and entering the compartment into an accessible state when the mobile robot arrives at the destination location. It is to be understood that the mobile robot 110, the user computing device 120, the facility component 130, the facility server 140, the navigation system 150, components thereof (e.g., navigation controller 116, user access controller 117, sensors 114, processors 111), and/or other components described herein and combinations thereof may be configured to perform some, all, and/or portions of the various actions and functionalities of the method 400 described herein.

The method 400 may include receiving from a user a user authorization indicating a desired user access to an electronically securable storage compartment (block 402). The user authorization may be made via a protected communication protocol, and the electronically securable storage compartment may be accessible to a user and electronically controllable. In particular, the electronically securable storage compartment may be electronically controllable between a stored state in which contents within the electronically securable storage compartment are inaccessible to the user and an accessible state in which the contents within the electronically securable storage compartment are accessible to the user.

The method 400 may further include receiving positional data from a navigation system spanning a facility navigatable by the mobile robot (block 404). The method 400 may also include determining, in response to the received positional data, an initial location within the facility and a destination location within the facility (block 406).

In certain embodiments, the method 400 may further include initiating a secured operation state of the mobile robot, and maintaining the mobile robot in the secured operation state from the initial location to the destination location. In these embodiments, the secured operation state may include (i) securing the electronically securable storage compartment, (ii) being assigned to move with a subject throughout the facility, (iii) detecting sensor data associated with the subject, (iv) being assigned to monitor vitals of the subject during movement of the subject, and/or (v) being assigned to greet the subject and direct the subject to a further destination.

The method 400 may further include entering the electronically securable storage compartment into the stored state in response to receiving user authorization and a confirmation that the mobile robot is at the initial location (block 408). In certain embodiments, the method 400 further includes receiving sensor data from a sensor configured to track inventory of the contents of the electronically securable storage compartment, and determining when the inventory of the contents of the electronically securable storage compartment violates a predetermined condition. For example, the predetermined condition may be or include a certain expected weight of particular contents, and/or an expected number or density of particular contents that is derived from interpretation of image data representing the particular contents. In these embodiments, the method 400 may further include issuing an alert when the inventory of the contents of the electronically securable storage compartment violates the predetermined condition.

In certain embodiments, the method 400 may further include establishing a recharge threshold. In these embodiments, the navigation controller may instruct the mobile robot to travel to a charger location to recharge a battery of the mobile robot when a battery level is below the recharge threshold. Further in these embodiments, the method 400 may include determining that the recharge threshold is reached while the electronically securable storage compartment is in the stored state, and instructing the mobile robot to travel to the destination location when (i) the battery level is at or below the recharge threshold and (ii) sufficient charge is present in the battery to reach the destination location.

The method 400 may further include entering the electronically securable storage compartment into the accessible state in response to receiving the user authorization and a confirmation that the mobile robot is at the destination location (block 410). In certain embodiments, the method 400 may further include issuing an alert when the electronically securable storage compartment remains in the accessible state for a predetermined time period. Further in these embodiments, the method 400 may also include entering the electronically securable storage compartment into the stored state after the predetermined time period.

Additionally, it is to be understood that each of the actions described in the method 400 may be performed in any order, number of times, or any other combination(s) therein suitable to control a mobile robot to escort high priority items. For example, some or all of the blocks of the method 400 may be fully performed once, multiple times, or not at all.

Figure 5A:
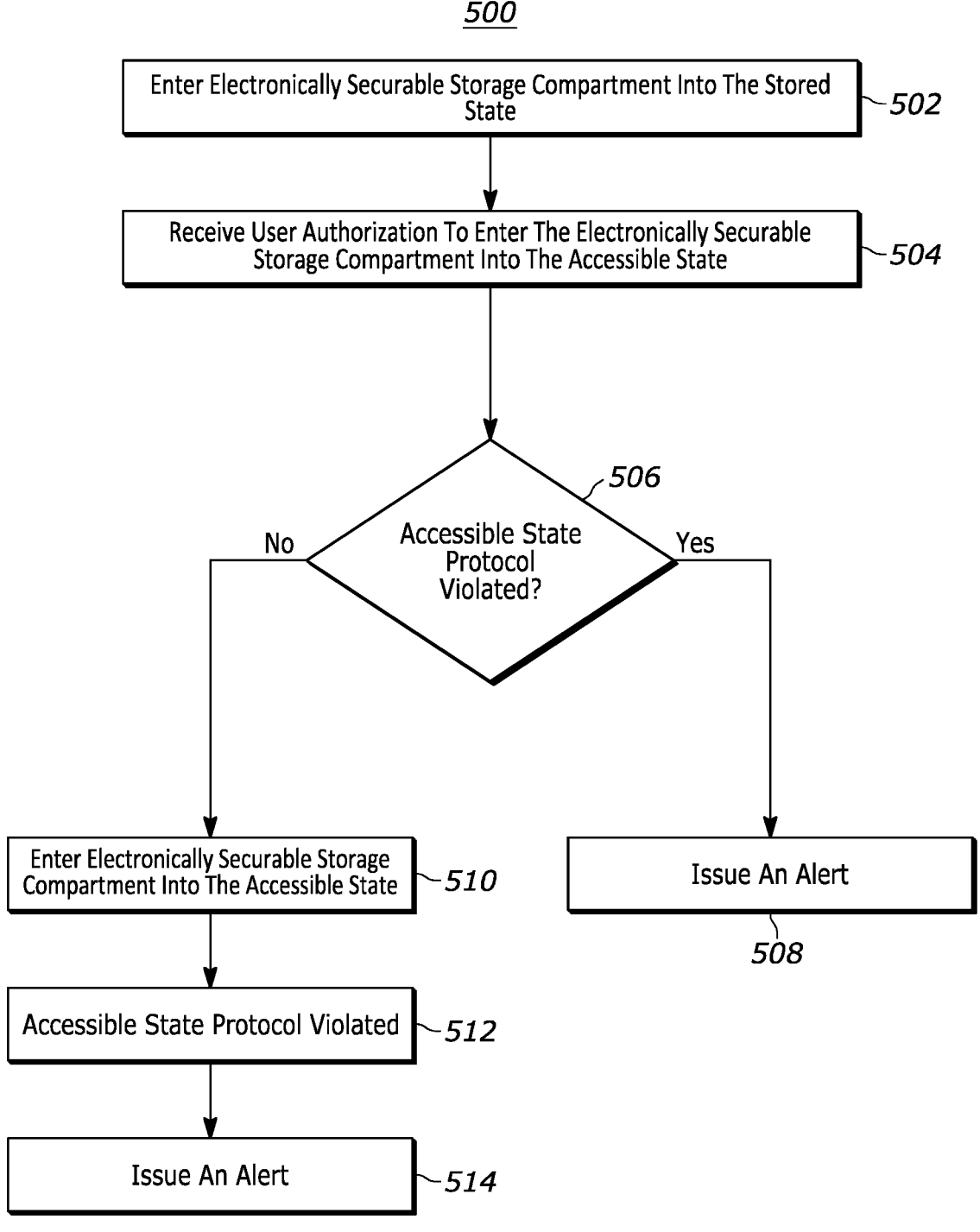
FIG. 5A is a flowchart representative of another method for controlling a mobile robot to escort high priority items, in accordance with embodiments described herein.

FIG. 5A is a flowchart representative of another method 500 for controlling a mobile robot to escort high priority items, in accordance with embodiments described herein. The method 500 generally represents a security routine corresponding to an electronically securable storage compartment of a mobile robot. The security routine generally includes entering the compartment into a stored state, receiving user authorization to enter the compartment into an accessible state, determining whether or not an accessible state protocol has been violated, and performing an action in response to the determination.

The method 500 includes entering the electronically securable storage compartment into the stored state (block 502). As previously mentioned, the mobile robot may electronically lock, shield, and/or otherwise restrict access to the electronically securable storage compartment. As part of this electronic control of the electronically securable storage compartment, the mobile robot may receive timing protocol(s) and/or other rules that dictate and/or otherwise define the timing and control procedures for the storage compartment as part of any particular escort function. For example, the mobile robot may enter the compartment into the stored state as a result of receiving a high priority item in the compartment, reaching a particular predefined proximity to an individual (e.g., medical patient), and/or any other suitable portion of an escort function. This timing protocol(s) may also include a main/primary protocol and an exception/secondary protocol.

More specifically, the main/primary protocol and/or the exception/secondary protocol may be or include certain mitigation protocols. The mitigation protocols may be or include (i) alerting security personnel, (ii) activating an onboard annunciator, (iii) activating a remote annunciator, (iv) capturing image data of an unauthorized user, (v) capturing video data of the unauthorized user, (vi) broadcasting a signal to deactivate the contents within the electronically securable storage compartment, (vii) following the unauthorized user to an exit door, (viii) following the unauthorized user to a car to obtain pictures of a license plate of the car, (ix) charging the unauthorized user for a value of the contents within the electronically securable storage compartment, (x) transmitting a signal to secure the exit door, and/or (xi) entering a permanent stored state.

At block 504, the mobile robot may receive user authorization to enter the electronically securable storage compartment into the accessible state. This user authorization may be and/or otherwise include a user providing a password, facial recognition, scanning a badge, and/or any other suitable authorization.

At block 506, the mobile robot may determine whether or not an accessible state protocol has been violated. These accessible state protocols may be or include, for example, the mobile robot being released from the stored state in a predetermined amount of time, the electronically securable storage compartment being removed from the accessible state within a predetermined amount of time, the mobile robot battery level reaching a recharge threshold, and/or any other suitable protocol or combinations thereof.

To illustrate, the mobile robot may analyze whether or not the electronically securable storage compartment was released from the stored state in the predetermined amount of time, as set by a hospital system or retail store system. The predetermined amount of time may generally correspond to an expected and/or approximate amount of time the mobile robot may take to complete the secure escort function with the electronically securable storage compartment in the stored state.

For example, a secure escort function may include the mobile robot transporting medication within the electronically securable storage compartment from a medication supply point within a hospital to a particular patient's room. The medical staff or other suitable medical professionals may set a predetermined amount of time of five minutes for the mobile robot to transport the medication within the electronically securable storage compartment while the compartment is in the stored state and therefore inaccessible to unauthorized users. In this example, if the mobile robot remains in the secured state for longer than five minutes (i.e., the medication remains in the locked and/or otherwise inaccessible compartment for longer than five minutes), then the mobile robot may initiate the exception/secondary protocols to enter the electronically securable storage compartment into a permanent stored state. This permanent stored state may cause the mobile robot to lock and/or otherwise render the electronically securable storage compartment inaccessible to any/all users that cannot satisfy particular condition(s) (e.g., employee facial recognition verification, credential scanning) to release the compartment from the stored state. Moreover, when the mobile robot enters the permanent stored state, the mobile robot may generate and transmit an alert signal to an authorized user.

As another example, the mobile robot may determine that the remaining battery charge is approaching and/or otherwise reaching a recharge threshold, and the mobile robot may estimate that the battery drain/draw required to complete the escort function may violate the recharge threshold. Alternatively, the mobile robot may not currently have an assigned escort function, and the mobile robot may not know how long the battery will be needed. Regardless, the mobile robot may initiate the exception/secondary protocols to enter the electronically securable storage compartment into a permanent stored state and/or transmitting an alert of a potential security issue/risk to a store employee or supervisor.

As previously mentioned, the exception/secondary protocols may cause the mobile robot to enter the permanent stored state by locking and/or otherwise rendering the electronically securable storage compartment inaccessible to any/all users that cannot satisfy particular condition(s) (e.g., employee facial recognition verification, credential scanning) to release the compartment from the stored state. These particular condition(s) may supersede other access requirements that may have previously been included as part of a secure escort function. For example, a secure escort function may require facial recognition of a patient and/or a nurse to release medication transported to the patient's room. However, as a result of the mobile robot entering the permanent stored state, the mobile robot may not permit access to the electronically securable storage compartment without facial recognition of a prescribing doctor, credential scanning of a nurse that dispensed the medication, and/or other suitable condition(s) or combinations thereof.

In any event, if the mobile robot determines that an accessible state protocol has been violated (YES branch of block 506), then the method 500 may proceed to block 508. If the mobile robot determines that accessible state protocol has not been violated (NO branch of block 506), then the method 500 may proceed to block 510. At block 508, the mobile robot may generate and transmit an alert signal to an employee or other security personnel indicating that an accessible state protocol has been violated, and that some form of remediation is required. For example, the alert signal may indicate that a password was incorrectly entered, and as a result, the electronically securable storage compartment was entered into the permanent secured state, and the high priority item was not released. The alert signal may also include an approximate location of the mobile robot, so that upon receiving the alert signal, the employee, security personnel, medical staff may locate the mobile robot, perform a remediation action (e.g., entering a password, facial recognition, credential scanning) to remove the mobile robot and electronically securable storage compartment from the permanent stored state.

At block 510, the mobile robot may enter the electronically securable storage compartment into the accessible state. At this point, a customer, patient, medical professional, or other user may remove the high priority item from the electronically securable storage compartment. However, the user may only have a predetermined period of time in which to remove the high priority item before the user violates another accessible state protocol.

Namely, at block 512, the user may fail to remove the high priority item within the predetermined period of time, and the mobile robot may determine that an accessible state protocol has been violated. In particular, the mobile robot may determine that the length of time that the electronically securable storage compartment was in the accessible state exceeded the predetermined amount of time that the electronically securable storage compartment is allowed to be in the accessible state. Thus, the mobile robot may subsequently initiate the exception/secondary protocols to enter the electronically securable storage compartment into the permanent stored state and/or issue an alert signal (block 514).

FIG. 5B is a flowchart representative of yet another method 550 for controlling a mobile robot to escort high priority items, in accordance with embodiments described herein.

At block 552, the mobile robot may establish a recharge threshold. The recharge threshold may generally indicate a battery charge level, below which, the mobile robot initiates default battery usage protocols configured to instruct the mobile robot in a manner that preserves remaining battery charge when the mobile robot is not involved in a secure delivery. For example, the default battery usage protocols may include instructions that cause the mobile robot to automatically re-route towards a nearest recharge location once the recharge threshold is reached. However, when the mobile robot is involved in a secure delivery or escort function, alternate battery usage protocols may be activated, which include instructions that prioritize timely delivery of the secured item to the destination location by foregoing the time to recharge the battery before completion of the delivery task.

In such an embodiment, at block 554, the mobile robot may determine that the recharge threshold is reached while the electronically securable storage compartment is in the stored state. Namely, while the mobile robot is performing a secure escort function, the mobile robot may determine that the remaining battery charge is less than or equal to the recharge threshold, such that the mobile robot may initiate the alternate battery usage protocol. As part of this alternate battery charging protocol, the mobile robot may first determine whether or not the mobile robot has sufficient battery charge remaining to reach the destination location (block 556).

If the mobile robot determines that sufficient battery charge remains to reach the destination location (YES branch of block 556), then the alternate battery usage protocol may instruct the mobile robot to travel to the destination location (block 558). In an embodiment, the alternate battery usage protocol may include instructions that cause the mobile robot to travel to the destination location in the circumstance where the mobile robot may likely reach a recharge location after completing the secure escort function. For example, the mobile robot may reach the recharge threshold during delivery of medical supplies to a patient's room. Accordingly, the alternate battery usage protocol may instruct the mobile robot to determine that there is sufficient charge remaining in the battery to reach the patient's room with the electronically securable storage compartment in the stored state, release the compartment to the accessible state once the mobile robot reaches the patient's room and receives an appropriate user authorization, and travel to a proximate recharge location without fully draining the battery.

In certain embodiments, the mobile robot may also determine whether or not the mobile robot has sufficient charge remaining to reach the destination location (and complete the secure escort function), and thereafter to reach a recharge location. In these embodiments, the mobile robot may determine that insufficient charge remains to reach the destination location and the recharge location afterwards. In this instance, the mobile robot may complete the secure escort function and transmit a signal indicating assistance is required to reach the recharge location.

Additionally, or alternatively, an alternate battery usage protocol may instruct and/or otherwise include the mobile robot performing path planning to determine a shortest route between the destination location and any proximate recharge location. In this manner, the alternate battery usage protocol may enable the mobile robot to complete secure escort functions and transmit signals indicating required assistance or reach battery recharge locations without fully draining the battery.

However, if the mobile robot determines that insufficient battery charge remains to reach the destination location (NO branch of block 556), then the alternate battery usage protocol may instruct the mobile robot to determine any/all available mitigation actions (block 560). The mitigation actions may generally be or include reducing a number of assigned tasks, re-routing the mobile robot, flagging and authorized user, and/or other suitable action or combinations thereof. Embodiments of the alternate battery usage protocol may cause the mobile robot to determine which mitigation actions are relevant to the current situation, and may further cause the mobile robot to determine which mitigation actions should be performed and/or an order in which the mitigation actions should be performed.

For example, the mobile robot may be executing a secure escort function to deliver medication to a patient's room, and may also have one or more other tasks to perform along the way to the patient' room. In this circumstance, the alternate battery usage protocol may cause the mobile robot to determine whether or not reducing the number of tasks assigned to the mobile robot would enable the mobile robot to complete the secure escort function. If so, then the alternate battery usage protocol may further cause the mobile robot to complete the secure escort function, but may remove some/all of the interim tasks assigned to the mobile robot while on the way to the patient's room to optimize use of the remaining battery life for the secure escort function.

As another example, the mobile robot may be performing a secure escort function that takes the mobile robot along a first route that includes multiple interim locations when the recharge threshold is reached/exceeded. The alternate battery usage protocol may cause the mobile robot to determine if a shorter/alternative route can be identified through the facility that would enable the mobile robot to complete the secure escort function without fully depleting the battery charge. If the mobile robot is able to identify such a route, then the mobile robot may travel along the shorter/alternative route to complete the secure escort function. To illustrate, if the mobile robot is performing a secure escort function that causes the mobile robot to escort a customer around a facility (e.g., with a high priority item), then the mobile robot may reach/exceed the recharge threshold, announce that the mobile robot may meet the customer at a POS station, and may proceed directly to the POS station to preserve battery life.

As another example, the mobile robot may be performing a secure escort function, and the mobile robot may reach or exceed the recharge threshold during performance of the secure escort function. The alternate battery usage protocol may cause the mobile robot to transmit an alert/notification to an authorized user that the mobile robot may be unable to reach the destination location, but that the mobile robot may maintain the electronically securable storage compartment in the stored state until the authorized user reaches the mobile robot and provides user authorization to enter the compartment into the accessible state. As part of this notification, the authorized user may be required to authorize such an alteration to the secure escort function, such that the mobile robot may only remain stationary with the compartment in the stored state with prior user authorization.

In any event, the mobile robot may proceed to perform the available mitigation action(s) in response to instructions included as part of the battery charging protocol (block 562). Moreover, when the mobile robot performs any suitable/ available mitigation action(s), the alternate battery usage protocol may instruct the mobile robot to travel to a recharge location (block 564). In an alternate embodiment, traveling to a recharge location may be included as one of the available mitigation action(s), such that the mobile robot may not need to travel to a recharge location after completion of the available mitigation action(s) and/or the secure escort function. Regardless, and as described herein, activation of the alternate battery usage protocol during secure delivery may generally enable the mobile robot to perform secure escort functions efficiently, and may avoid situations where the mobile robot is unable to complete secure delivery of the item on time due to the need for additional time to recharge its battery.

Additional Considerations

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A mobile robot comprising:

an electronically securable storage compartment accessible to a user and electronically controllable between a stored state in which contents within the electronically securable storage compartment are inaccessible to the user and an accessible state in which the contents within the electronically securable storage compartment are accessible to the user; and a navigation controller configured to:

receive positional data from a navigation system spanning a facility navigatable by the mobile robot;

determine, in response to the received positional data, an initial location within the facility and a destination location within the facility;

establish a recharge threshold, such that, in a default battery usage profile, the navigation controller instructs the mobile robot to travel to a charger location to recharge a battery of the mobile robot when a battery level is below the recharge threshold;

determine that the recharge threshold is reached while the electronically securable storage compartment includes the contents and is in the stored state; and when the electronically securable storage compartment includes the contents and is in the stored state, prioritize delivery of the contents by foregoing recharging and entering an alternate battery usage profile by instructing the mobile robot to travel to the destination location in response to determining that: (i) the battery level is at or below the recharge threshold and (ii) sufficient charge is present in the battery to reach the destination location;

wherein a user access controller of the mobile robot is configured to enter the electronically securable storage compartment into the stored state in response to receiving user authorization and a confirmation that the mobile robot is at an initial location and configured to enter the electronically securable storage compartment into the accessible state in response to receiving the user authorization and a confirmation that the mobile robot is at the destination location.

2. The mobile robot of claim 1, wherein the user access controller is further configured to issue an alert when the electronically securable storage compartment remains in the accessible state for a predetermined time period.

3. The mobile robot of claim 1, further comprising:

a sensor configured for tracking inventory of the contents of the electronically securable storage compartment.

4. The mobile robot of claim 3, wherein the user access controller is further configured to issue an alert when the inventory of the contents of the electronically securable storage compartment violates a predetermined condition.

5. The mobile robot of claim 1, wherein the user access controller is further configured to:

initiate a secured operation state of the mobile robot; and maintain the mobile robot in the secured operation state from the initial location to the destination location, wherein the secured operation state includes one or more of: (i) securing the electronically securable storage compartment, (ii) being assigned to move with a subject throughout the facility, (iii) detecting sensor data associated with the subject, (iv) being assigned to monitor vitals of the subject during movement of the subject, (v) being assigned to greet the subject and direct the subject to a further destination, or (vi) monitoring the electronically securable storage compartment during travel from the initial location to the destination location.

6. The mobile robot of claim 1, wherein:

the user access controller receives a user authorization indicating a desired user access to the electronically securable storage compartment; and the user authorization is selected from a group consisting of: (i) payment confirmation, (ii) facial recognition of the user, (iii) identification (ID) verification, (iv) biometric verification, (v) scanning an indicia, (vi) confirmation that the mobile robot is at the destination location, and (vii) password verification.

7. The mobile robot of claim 1, wherein the user access controller is configured to trigger a mitigation protocol when the electronically securable storage compartment is accessed without receiving a user authorization, wherein the mitigation protocol is selected from a group consisting of: (i) alerting security personnel, (ii) activating an onboard annunciator, (iii) activating a remote annunciator, (iv) capturing image data of an unauthorized user, (v) capturing video data of the unauthorized user, (vi) broadcasting a signal to deactivate the contents within the electronically securable storage compartment, (vii) following the unauthorized user to an exit door, (viii) following the unauthorized user to a car to obtain pictures of a license plate of the car, (ix) charging the unauthorized user for a value of the contents within the electronically securable storage compartment, and (x) transmitting a signal to secure the exit door.

8. The mobile robot of claim 1, wherein the user access controller is configured to:

determine that the electronically securable storage compartment remains in the accessible state by having a door open for a predetermined time period; and in response to determining that the electronically securable storage compartment remains in the accessible state for the predetermined time period, enter the electronically securable storage compartment into the stored state by causing the door to close after the predetermined time period.

9. A method for controlling a mobile robot to deliver high priority items, the method comprising:

receiving an authorization to access an electronically securable storage compartment of the mobile robot, the electronically securable storage compartment electronically controllable between a stored state in which contents within the electronically securable storage compartment are inaccessible to a user and an accessible state in which the contents within the electronically securable storage compartment are accessible to the user;

receiving positional data from a navigation system spanning a facility navigatable by the mobile robot;

determining, in response to the received positional data, an initial location within the facility and a destination location within the facility;

establishing a recharge threshold, such that, in a default battery usage profile, the mobile robot is instructed to travel to a charger location to recharge a battery of the mobile robot when a battery level is below the recharge threshold;

determining that the recharge threshold is reached while the electronically securable storage compartment includes the contents and is in the stored state; and when the electronically securable storage compartment includes the contents and is in the stored state, prioritizing delivery of the contents, by a navigation controller of the mobile robot, by foregoing recharging and entering an alternate battery usage profile by instructing the mobile robot to travel to the destination location in response to determining that: (i) the battery level is at or below the recharge threshold and (ii) sufficient charge is present in the battery to reach the destination location;

wherein a user access controller of the mobile robot is configured to enter the electronically securable storage compartment into the stored state in response to receiving user authorization and a confirmation that the mobile robot is at an initial location and configured to enter the electronically securable storage compartment into the accessible state in response to receiving the user authorization and a confirmation that the mobile robot is at the destination location.

10. The method of claim 9, further comprising:

issuing an alert when the electronically securable storage compartment remains in the accessible state for a predetermined time period.

11. The method of claim 10, further comprising:

entering the electronically securable storage compartment into the stored state after the predetermined time period.

12. The method of claim 9, further comprising:

receiving sensor data from a sensor configured to track inventory of the contents of the electronically securable storage compartment; and issuing an alert when the inventory of the contents of the electronically securable storage compartment violates a predetermined condition.

13. The method of claim 9, further comprising:

initiating a secured operation state of the mobile robot; and maintaining the mobile robot in the secured operation state from the initial location to the destination location, wherein the secured operation state includes one or more of: (i) securing the electronically securable storage compartment, (ii) being assigned to move with a subject throughout the facility, (iii) detecting sensor data associated with the subject, (iv) being assigned to monitor vitals of the subject during movement of the subject, or (v) being assigned to greet the subject and direct the subject to a further destination.

* * * * *